(12) United States Patent
Takata et al.

(10) Patent No.: US 7,240,188 B2
(45) Date of Patent: Jul. 3, 2007

(54) STORAGE SYSTEM

(75) Inventors: Yutaka Takata, Ninomiya (JP);
Naotaka Kobayashi, Odawara (JP);
Takeshi Hashimoto, Manaduru (JP);
Akiyoshi Hashimoto, Kawasaki (JP);
Shinichi Nakayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 10/940,625

(22) Filed: Sep. 15, 2004

(65) Prior Publication Data

US 2006/0015861 A1    Jan. 19, 2006

(30) Foreign Application Priority Data

Jul. 15, 2004    (JP) .............................. 2004-208105

(51) Int. Cl.
*G06F 9/44*    (2006.01)
(52) U.S. Cl. ........................... 713/1; 717/168; 717/162
(58) Field of Classification Search ...................... None
See application file for complete search history.

(56) References Cited

U.S. PATENT DOCUMENTS

| | | | |
|---|---|---|---|
| 5,699,504 A * | 12/1997 | Mano | 714/13 |
| 5,729,761 A * | 3/1998 | Murata et al. | 710/14 |
| 6,675,258 B1 * | 1/2004 | Bramhall et al. | 711/114 |
| 6,715,100 B1 * | 3/2004 | Hwang | 714/5 |
| 2004/0206776 A1 * | 10/2004 | Awbrey et al. | 222/105 |
| 2004/0255286 A1 * | 12/2004 | Rothman et al. | 717/168 |
| 2004/0268037 A1 * | 12/2004 | Buchanan et al. | 711/114 |

* cited by examiner

*Primary Examiner*—Thuan N. Du
*Assistant Examiner*—Fahmida Rahman
(74) *Attorney, Agent, or Firm*—Reed Smith LLP; Stanley P. Fisher, Esq.; Juan Carlos A. Marquez, Esq.

(57) ABSTRACT

A technique that can update the firmware with services for clients continued on a circuit board that comprises a control unit of a storage system is provided. A plurality of blade that comprise control unit have previous BIOS on flash memory. Clusters are formed including the blade which is subject to firmware update. At the time of updating the firmware, for the update candidate substrate, the processing unit including processing to move the service provided by OS of blade to be subject to firmware update processing to OS of other blade in the cluster as well as firmware update processing for updating previous BIOS of blade which no longer provides services by the use of the BIOS update program and new BIOS image.

19 Claims, 19 Drawing Sheets

FIG. 7

| Blade | Host name | Service IP address | Original blade | Service condition |
|---|---|---|---|---|
| Blade1 | Server1 | 192.168.1.10 | Blade1 | In service |
| Blade2 | Server2 | 192.168.1.20 | Blade2 | In service |
| Blade3 | Server3 | 192.168.1.30 | Blade3 | In service |

25a, 25b, 25c, 25d, 25e

⇩ After fail-over (Blade 1: down; Blade 2 takes up the service.)

| Blade | Host name | Service IP address | Original blade | Service condition |
|---|---|---|---|---|
| Blade1 | Server1 | 192.168.1.10 | Blade1 | Out of service |
| Blade2 | Server2 | 192.168.1.20 | Blade2 | In service |
| | Server1 | 192.168.1.10 | Blade1 | In service |
| Blade3 | Server3 | 192.168.1.30 | Blade3 | In service |

FIG. 8

| Blade | Device | Mount condition | Original blade |
|---|---|---|---|
| Blade1 | Disk1 | Mounted | Blade1 |
| | Disk2 | Mounted | Blade1 |
| Blade2 | Disk3 | Mounted | Blade2 |
| Blade3 | Disk4 | Mounted | Blade3 |

26a, 26b, 26c, 26d

⇩ After fail-over (Blade 1: down; Blade 2 takes up the service.)

| Blade | Device | Mount condition | Original blade |
|---|---|---|---|
| Blade1 | Disk1 | Unmounted | Blade1 |
| | Disk2 | Unmounted | Blade1 |
| Blade2 | Disk3 | Mounted | Blade2 |
| | Disk1 | Mounted | Blade1 |
| | Disk2 | Mounted | Blade1 |
| Blade3 | Disk4 | Mounted | Blade3 |

STORAGE SYSTEM

CROSS-REFERENCE TO RELATED APPLICATION

The present application claims priority from Japanese Patent Application No. JP 2004-208105 filed on Jul. 15, 2004, the content of which is hereby incorporated by reference into this application.

TECHNICAL FIELD OF THE INVENTION

The present invention relates to a storage system (also called a disk-array unit) for carrying out the control to store data in a storage unit, and in particular, to a technique for updating firmware including BIOS (Basic Input Output System) of a circuit board in the storage system.

In the storage system that carries out control for storing the data in a storage unit, in particular, the storage device used in companies and others, it is required to operate 24 hours a day every day in 365 days without stopping. Updating of firmware (version upgrading, etc.) in such a storage system, rebooting (restart) is involved as with other computer systems, and services to clients must be temporarily interrupted.

BACKGROUND OF THE INVENTION

In the conventional storage system, and the computer system comprising the storage system, client information processing apparatus, network, etc., the hardware is initialized by the program including firmware, that is, BIOS, stored in the nonvolatile memory and activates OS (Operating System) at the activation of the circuit board that composes the control unit of the storage system. In the storage system, to update the firmware and make the update effective, the system that uses the firmware must be rebooted. Rebooting the system that uses the firmware, as is obvious, temporarily interrupts the service (process) to the client by the OS operated on the CPU of the circuit board.

SUMMARY OF THE INVENTION

Conventionally, in the storage system, it has been unable to update the firmware on the circuit board with services to clients continued. That is, from the viewpoint of mechanism concerning the firmware, for a single computer, shut-down (operation stop) of OS for firmware updating and service interruption due to reboot of the computer system has been unavoidable. However, from the viewpoint of functions expected for the storage system, it is desirable to continue services even when the firmware is updated.

The present invention has been made in view of the above-mentioned problems, and the objective of the present invention is to provide a technique that enables firmware updating with services to clients continued in the storage system.

To achieve the above-mentioned object, the storage system according to the present invention comprises one or more storage devices and control units (storage device controller) composed with a plurality of circuit boards (blade boards) to carry out control for storing the data in the storage device, and further comprises the technical means shown in Paragraphs (1) and (2) below in the configuration that provides services concerning inputs and outputs of the data by OS that operates on the CPU to information processing apparatuses connected through a first network.

(1) In the storage system according to the present invention, the circuit board comprises CPU, I/O processor (IOP) for controlling inputs and outputs between the CPU and storage device, memory for jobs of the CPU and IOP (RAM, etc.), nonvolatile memory (flash memory, etc.) for holding firmware (program including BIOS), and network control section (LAN controllers, etc.) for performing communication processing. By OS that operates on the CPU, services for inputting and outputting data to the storage area of the storage device on the basis of the request from the information processing unit which becomes a client. In the nonvolatile memory, the firmware containing BIOS for initializing the hardware and activating the OS is held. The OS should be the program including at least the host application programs and others. Under this kind of configuration, to update the firmware, the firmware is updated with emphasis placed on control by the IOP as follows.

In the control unit, a plurality of circuit boards are intercommunicably connected with circuit boards targeted for the update of the firmware included to form a cluster, and the control unit has a service move function to take on the service as required between OSs of circuit boards in the cluster. In a plurality of circuit boards of a cluster configuration, assume that there are one or more circuit boards (boards targeted for the update) which are subject to the firmware update. Under this condition, if there is any service which is now being provided in the circuit boards to be subject to firmware update processing, firmware update processing is implemented on the circuit board which becomes in no service providing state while moving the service to other circuit boards in the cluster using the service move function. That is, a processing unit including the service move processing to move all the services being provided by OS of the circuit board to other circuit boards in the cluster and enable the OS to be shut down for circuit boards to be subject to firmware update processing, and the firmware update processing to update the firmware (previous firmware) on the nonvolatile memory of the circuit board to new firmware using the firmware update program and the new firmware image is executed for the circuit board which has been brought to the no-service providing state by the move of the service. Although other circuit boards to which services are moved in the cluster subject to are not the firmware update processing when firmware update processing is executed for the circuit board from which the service is moved, but when firmware update processing is executed for this circuit board in compliance with the subsequent firmware update processing, the service will be further moved to other circuit boards in the cluster.

In the firmware update processing, for the circuit boards which are not providing any service by the move of the service, for example, the firmware is updated by the following processing procedure. First of all, based on the control of the IOP, directions are given to the OS which operates on CPU is shut down, CPU is reset and rebooted, and by this, the previous firmware (previous BIOS) on the nonvolatile memory is activated. And the activated previous firmware loads the firmware update program to the memory to move the control, and the firmware update program loads the new firmware image to the memory of the circuit board, writes the new firmware image to the nonvolatile memory to update the firmware, resets the CPU, and activates the new firmware (new BIOS) after the update, and by the activated new firmware, the OS is activated, and the IOP notifies the firmware update completion. Activating the new firmware after resetting the CPU makes the update of the firmware effective.

In addition, IOP of the circuit board monitors the CPU state, stores the OS state information that represents the operating and installation condition for the OS in the accessible memory, for example, the shared memory. The IOP of each circuit board decides the need or no-need of shut-down of the OS and the move of service between the circuit boards by referring to the OS state information.

Furthermore, the OS of the circuit board stores the control information for providing services to clients, for example, service information including IP address for servicing, service condition, and others, and disk information including the mount conditions of circuit board and memory device, and others in the storage area on the storage device. The OS changes these pieces of control information in conformity to the service move by the said service move function.

In addition, for the circuit boards for which firmware update is completed and firmware update is made effective, processing to return the service which has been provided before the firmware update and taken over by other circuit boards in the cluster may be carried out by the service move function.

In addition, for the circuit boards to be subject to the firmware update, with one or more circuit boards set as a unit, the processing units including the service move processing between the OSs of the circuit board in the cluster configuration and the firmware update processing of the circuit board after more of service successively executes. Updating all firmware of the circuit board to be subject to the update is completed by successively executing the processing units, and providing the service is continued with move of service providing source.

Furthermore, for the circuit board targeted for the update of the firmware, with a plurality of circuit boards of them set as a unit, processing units including the service move processing and the firmware update processing are executed concurrently in parallel, that is, temporally at the nearly same timing.

Furthermore, the firmware update directions are given to IOP of the subject circuit board from, for example, outside the circuit board to be subject to the firmware update processing, for example, from a maintenance device (maintenance PC) connected to the IOP of the circuit board through a second network. The maintenance device carries out the firmware update processing in the processing procedure on the basis of the control of IOP of the directed circuit board. In addition, when the new firmware becomes effective after firmware update processing, IOP notifies the update completion to the maintenance device, etc.

In the firmware update processing, the previous firmware does not have to carry out the loading if the firmware update program has already been acquired in the memory of the circuit board. In addition, the previous firmware refers to the memory and loads the firmware update program to the memory inside the circuit board when the firmware update program has been stored in an external memory of its own circuit board, for example, in the shared memory which a plurality of circuit boards in the storage system share and is accessibly provided.

In addition, the firmware update program does not have to carry out the loading when the new firmware image has already been acquired in memory of the circuit board. In addition, the firmware update program refers to the external memory and loads the new firmware image to the memory inside the circuit board when the new firmware image has been stored in an external memory of its own circuit board, for example, in the shared memory.

Furthermore, the storage system has maintenance devices which are connected to the circuit board composing the control unit through the second network and which can communicate each other. The maintenance device provides a user interface for jobs related to firmware update. That is, the maintenance device carries out update control processing for inputting and outputting the information which represents the service move processing and the firmware update processing condition, and the information for direction on the basis of the communication with IOP of the circuit board through the second network. For example, the maintenance device displays service move directions, service move completion condition or firmware update complete condition, and others, and issues firmware update directions and others to circuit boards on the basis of the operation inputs of the operator (maintenance personnel).

In addition, the storage system has an information processing apparatus for managing equipped with a managing program as the information processing apparatus. In the service move processing, the information processing apparatus for managing performs the processing to transmit the direction for moving the service to OS of subject substrates via the first network, and OS of the circuit boards move the service between the OSs of the circuit boards in the cluster on the basis of the directions.

The firmware update program and new firmware image which become necessary for the firmware update processing are provided by the maintenance device which acquires them and transmits them to the IOP of the circuit board. The firmware update program is a program to allow the circuit board to carry out processing for firmware update. The new firmware image is the data containing codes which will serve as new firmware after updating. The maintenance device transmits the firmware update program and new firmware image with the IOP of an optional circuit board used as a representative of the circuit boards targeted for the update of the firmware through the second network and allows the memory in the circuit board to acquire them. And from the representative IOP of the circuit board, the firmware update program and the new firmware image are stored in an external memory of the circuit board, for example, the shared memory. By storing the firmware update program and the new firmware image in an external memory of the circuit board, a plurality of circuit boards targeted for the update of the firmware can utilize the data stored on the external memory for firmware update processing.

The selection of the circuit boards targeted for the update of the firmware and the selection of circuit boards for concurrent and parallel execution of the firmware update processing are controlled to automatically take place in accordance with the setting of the storage system. Or, the selection is carried out and manipulated by the maintenance personnel who operates the maintenance device when firmware update is hoped to be implemented or the user-side administrator and others who operate the client information processing apparatus, and based on this, the processing is controlled.

In addition, for one processing methods for firmware updating, at the time of firmware updating, the information processing apparatus for managing carried out processing for transmitting the directions for moving the service to OS of the circuit board through the first network on the basis of the update control processing at the maintenance device and allows the services to be moved between OSs on the circuit boards in the cluster, and after the service is moved, the maintenance device carries out the processing for transmitting the firmware update directions to IPO of circuit boards which are subject to implementation of firmware update processing and allows the firmware update processing to take place.

In addition, as one processing method for updating the firmware, when the firmware is updated, the maintenance device conducts processing for transmitting firmware update directions to the IOP of the circuit board via the second network, the IOP of the circuit board gives directions for service move and shut-down to the OS on the basis of the directions from the maintenance device, and the OS of the circuit board carries out the move for taking on the service between OSs on the circuit board in the cluster, executes shut-down, and performs the firmware update processing after the shut-down based on the direction from the IOP.

In addition, as one processing method for updating the firmware, when the firmware is updated, the maintenance device conducts processing for transmitting directions to interrupt the service and update the circuit board targeted for the update of the firmware for executing the firmware update processing, the circuit boards interrupt the service being provided to stop service move processing on the basis of the directions from the maintenance device, and then, performs the firmware update processing, and upon completion of the update, begins providing the service in charge.

In addition, a plurality of cluster units containing the circuit board targeted for the update of the firmware are composed and the firmware may be update by combining relevant processing methods, in the cluster units.

In addition, when the new firmware image is stored in the shared memory at the time of expanding the circuit boards to the control unit, the storage system carries out processing for deciding whether or not the update is required for the firmware in the circuit boards expanded by referring to the version of the firmware on the nonvolatile memory of the circuit boards expanded and the version of the new firmware image stored on the shared memory, and in the event that the update is decided necessary, the storage system acquires the firmware update program and the new firmware image through the IOP and the second network in the expanded circuit boards and carries out firmware update processing for updating the firmware on the nonvolatile memory to the new firmware.

Furthermore, when the new firmware image is not stored on the shared memory at the time of expanding the circuit boards to the control unit, and other circuit boards are in operation, the storage system directs the IOP of the circuit boards under operation through the second network from the maintenance device, the IOP of the circuit boards under operation directs the CPU in accordance with the directions to read the new firmware image from the nonvolatile memory, performs the processing for storing the new firmware image read to the shared memory. The storage system executes firmware update processing on the expanded circuit board using the data stored in the shared memory.

Furthermore, when the new firmware image is not stored on the shared memory at the time of expanding the circuit boards to the control unit, and other circuit boards are not in operation, the firmware update program and the new firmware image are transmitted from the maintenance device to IOP of the expanded circuit board through the second network, the expanded circuit boards perform the processing for storing the firmware update program and the new firmware image to the shared memory. Based on the transmitted data, firmware update processing is executed on the circuit board expanded.

In addition, when circuit boards of the control unit are replaced (that is, the replacement subject circuit board is removed and the circuit board is mounted after replacement), the storage system carries out processing for deciding whether or not the update is required for the firmware in the circuit boards replaced by referring to the version of the firmware on the nonvolatile memory of the circuit boards replaced and the version of the new firmware image stored on the shared memory, or the version of the new firmware image acquired from the maintenance device and in the event that the update is decided necessary, the storage system acquires the firmware update program and the new firmware image through the IOP and the second network in the replaced circuit boards and carries out firmware update processing for updating the firmware on the nonvolatile memory to the new firmware. After the completion of update, the processing for returning the service from other circuit boards which took on the service provided by the circuit board before replacement is carried out by the service moving function as required.

(2) In the storage system according to the present invention, the circuit board comprises CPU, memory (RAM, etc.) which the CPU uses for its jobs, nonvolatile memory for holding firmware, and network control sections. By the OS which operate on the CPU, the circuit board provides services for inputting and outputting the data to the storage area of the storage device on the basis of the request from the client information processing apparatus. For the nonvolatile memory, firmware containing BIOS for initializing the hardware and activating the OS is held. The network control section is a communication interface for the first network. Under this configuration, in order to update the firmware, the firmware is updated with the primary emphasis placed on the control by OS operating on CPU of the circuit board as follows:

In the control unit, a cluster is formed by connecting a plurality of circuit boards with circuit board targeted for the update of the firmware included in such a manner as to enable intercommunication and has a service moving function for taking up the services between OSs on the circuit board in the cluster as required. In addition, the control unit has an information processing unit for managing equipped with a managing program as the information processing unit connected to the first network. The firmware update program is operated to update the firmware by OS operating on CPU of the circuit board.

In the event of updating the firmware, for the circuit boards targeted for the update of the firmware, processing for transmitting directions for updating the firmware is carried out through the first network from the information processing unit for managing to the OS of the circuit board.

The OS of the circuit board carries out service move processing for moving the service which the OS of the circuit board is being providing to the OS of other circuit board in the cluster by the service move function as well as firmware update processing for updating the firmware on the volatile memory to the new firmware using the firmware update program and the new firmware image for the circuit boards which are brought to the non-service providing condition because of the move of the service. The processing unit including the service move processing and the firmware updating processing is executed by operating the firmware update program by the OS of the circuit boards targeted for the update of the firmware. In the processing in relevant Paragraph (2), unlike the processing in foregoing Paragraph (1), processing by IPO and maintenance device is not required.

As one processing method for firmware updating, at the time of updating the firmware, the information processing unit for managing performs processing for transmitting directions to move the service to the OS of the circuit board through the first network as the service move processing, based on the directions, the OS of the circuit board moves the service between OSs on the circuit boards in the cluster. After the service is moved, the storage system performs processing for transmitting the firmware update program and the new firmware image to OS of the circuit board subject to the firmware update processing from the information processing unit for managing. The OS of the circuit board executes the firmware update program and conducts the firmware update processing using the new firmware image.

As one processing method for updating the firmware, in the event of updating the firmware, the information processing unit for managing performs processing for transmitting directions to update the firmware to the OS of the circuit board through the first network, the OS of the circuit board performs the processing for taking over the service between OSs on the circuit boards in the cluster, then, shuts down, and performs the firmware updating processing after the shut-down.

In addition, as one processing method for updating the firmware, in the event of updating the firmware, the information processing unit for managing performs processing for transmitting directions to interrupt the service and update the firmware to OSs of the circuit boards to be subject to the firmware update processing. The OSs of the circuit boards interrupt the service being provided and stop service move processing on the basis of the directions, and then, perform the firmware update processing, and upon completion of the update, begin providing the service in charge.

Of the inventions disclosed in the application concerned, effects which can be obtained from the typical inventions can be briefly described as follows:

According to the present invention, updating of the firmware containing BIOS in one or more circuit boards can be completed with services for clients continued.

In particular, according to the configuration of Paragraph (1) above, since firmware updating is controlled with primary emphasis placed on IOP of the circuit board and the firmware update program and the new firmware image are held in the shared memory and others, even when circuit boards are replaced or expanded, the firmware can be updated to the new firmware. Furthermore, even when OS is unable to be activated due to OS trouble or before OS is installed, the firmware can be updated.

In particular, according to the configuration of Paragraph (2), since the firmware update program is operated on OS of the circuit board, it is possible to load (file transfer) the program from PC and other general apparatus for firmware updating. Furthermore, because the firmware update program operates as the application that operates on the general-purpose OS, it is possible to operate the program by combining it with the OS functions.

BRIEF DESCRIPTIONS OF THE DRAWINGS

FIG. 7 is a table indicating control information, in particular, service information, related to the service provision held on the storage system in embodiment 1 according to the present invention;

FIG. 8 is a table indicating control information, in particular, disk information, related to the service provision held on the storage system in embodiment 1 according to the present invention;

Figure 20:
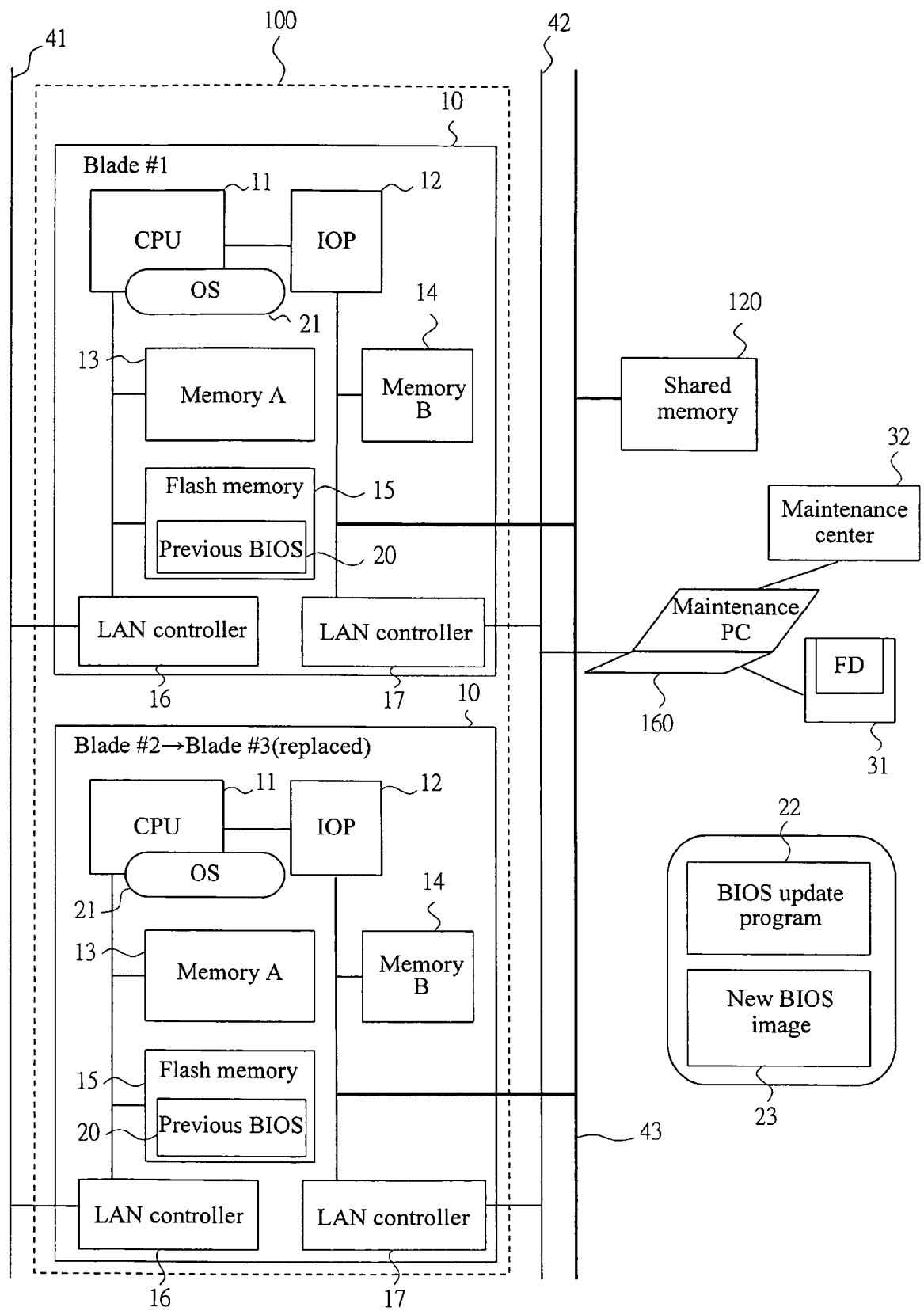
Figure 21:
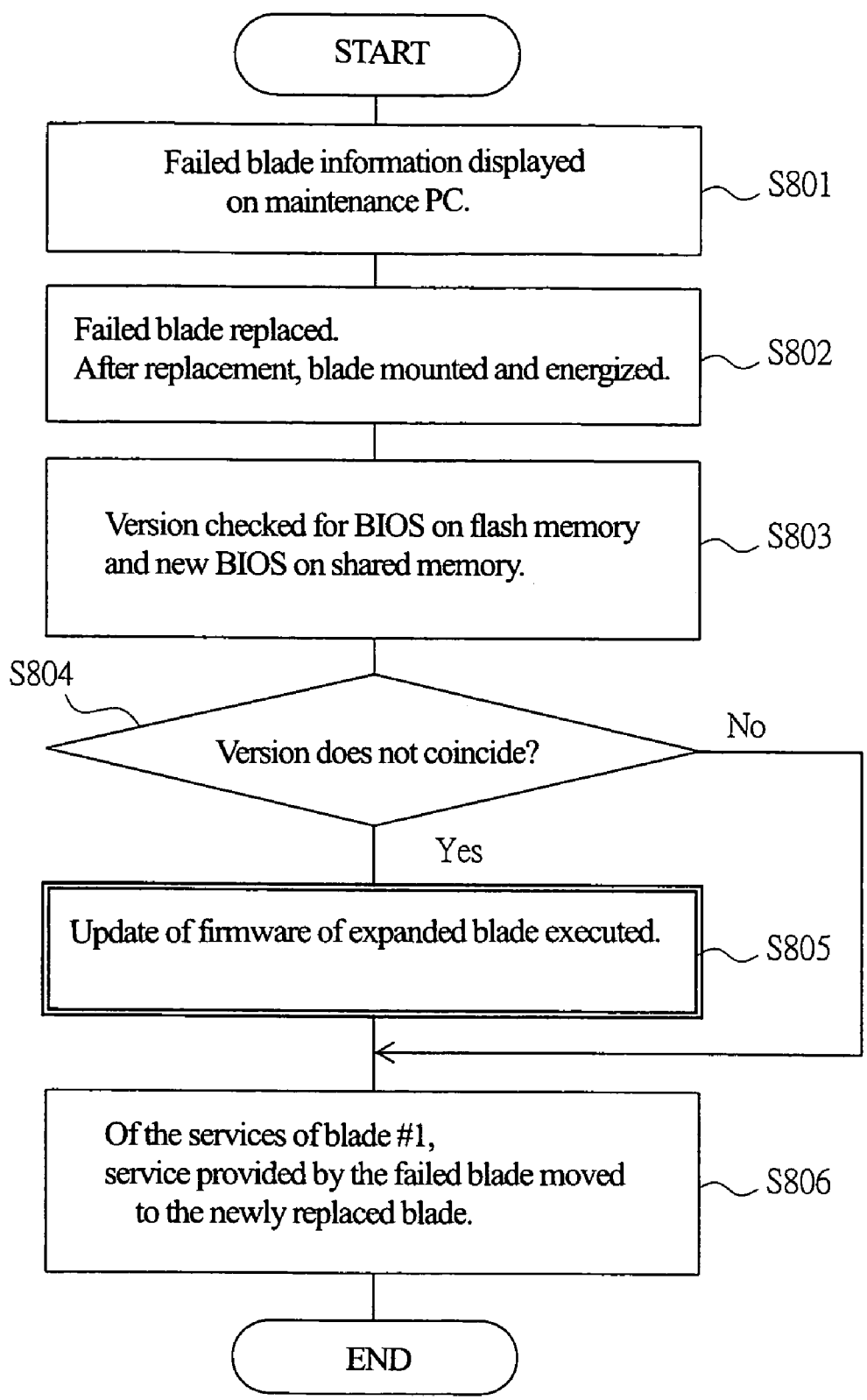

FIG. 20 is an illustration indicating a configuration related to firmware update processing when blade substrates are replaced in the storage system in embodiment 1 according to the present invention; and FIG. 21 is a flow chart indicating a processing procedure corresponding to the processing method when blade substrates are replaced in the storage system in embodiment 1 according to the present invention.

DESCRIPTION OF THE PREFERRED EMBODIMENTS

Referring now to the drawings attached, preferred embodiments of the present invention will be described in detail as follows. Throughout the several views describing the embodiments, like reference numerals, in principle, designate like or corresponding parts to eliminate the repeated description.

<Storage System and Total Configuration of the Computer System>

Figure 1:
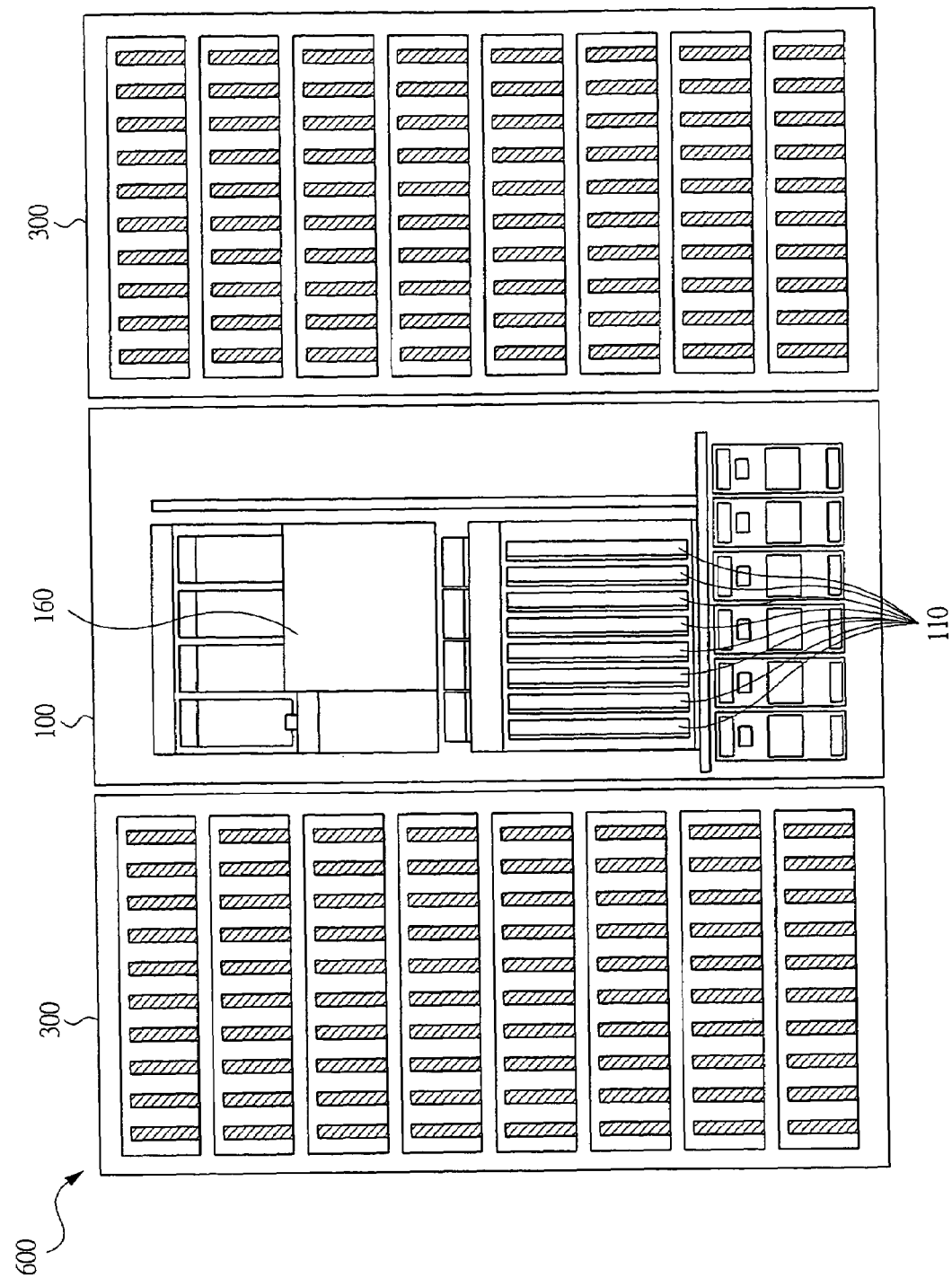
FIG. 1 is a diagram illustrating a hardware appearance configuration of a whole storage system related to each embodiment of the present invention.
Figure 2:
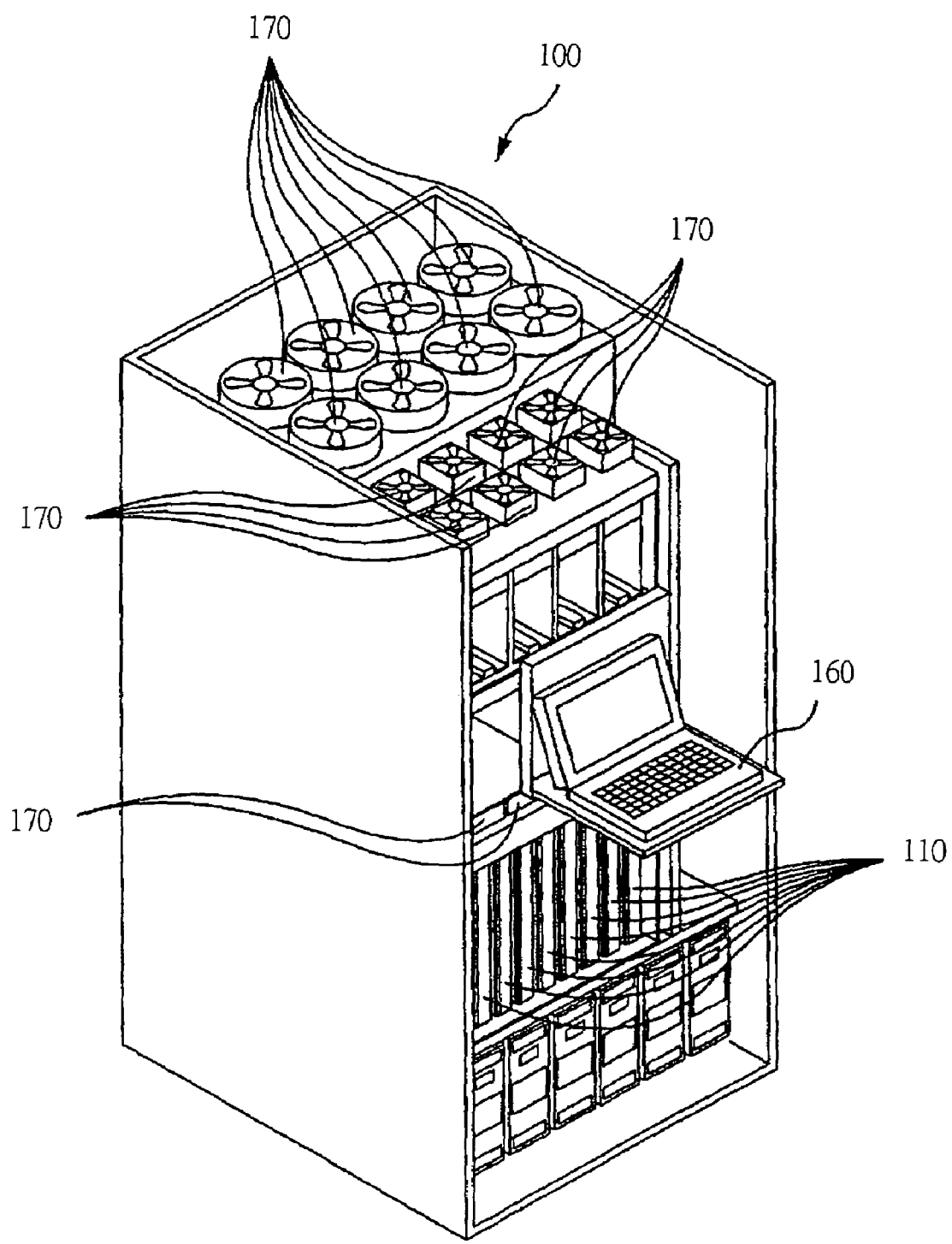
FIG. 2 is a diagram illustrating a hardware appearance configuration of a control unit of a storage system related to each embodiment of the present invention.
Figure 3:
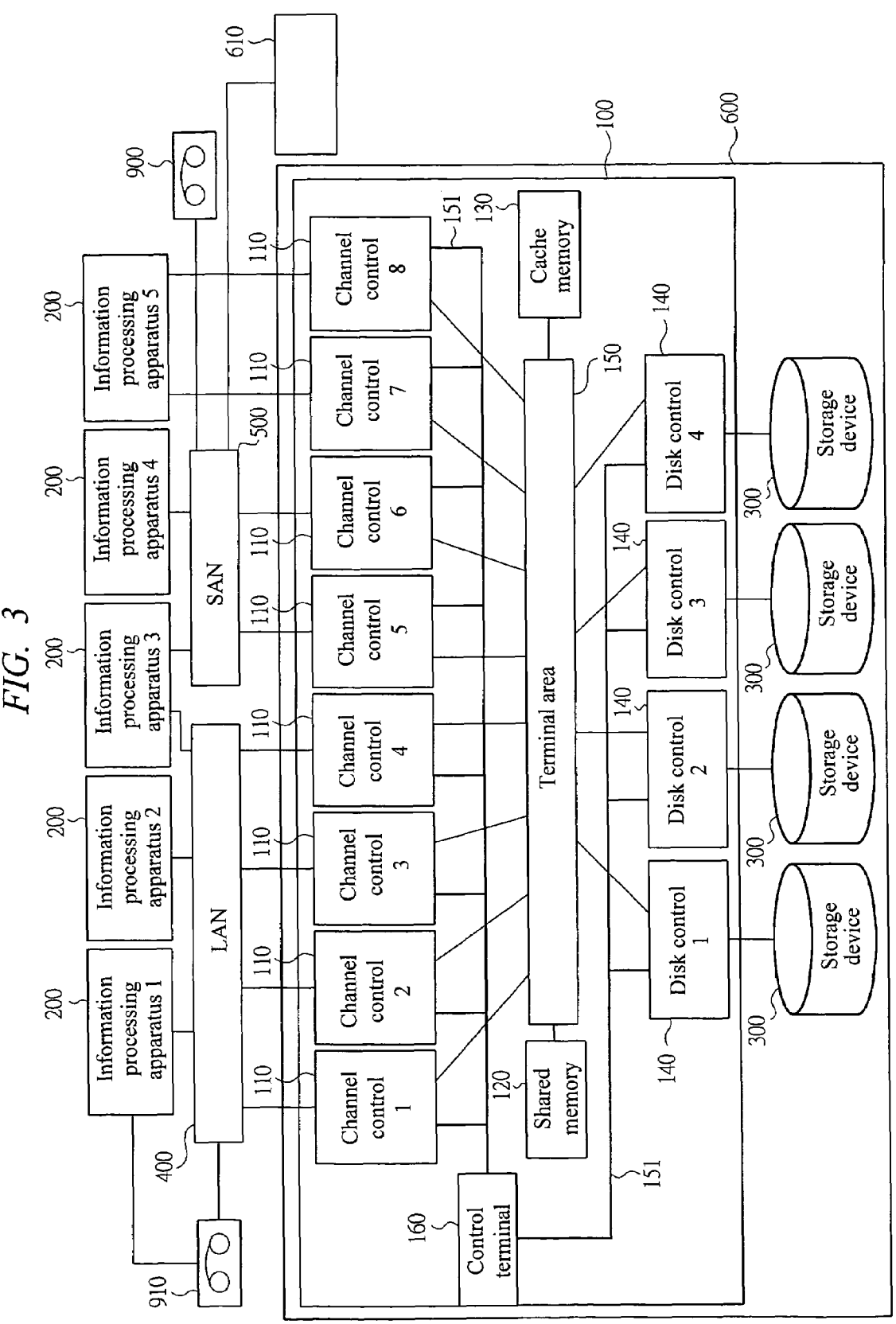
FIG. 3 is a diagram illustrating a functional block configuration of the whole computer system including a storage system related to each embodiment of the present invention.

The overall configuration of the storage system related to each embodiment will be described. FIG. 1 illustrates a hardware appearance configuration of a whole storage system related to each embodiment. FIG. 2 illustrates, in particular, a hardware appearance configuration of control unit of a storage system related to each embodiment. FIG. 3 is a diagram illustrating a functional block configuration of the whole computer system including a storage system related to the present embodiment.

In FIG. 1, storage system 600 related to each embodiment is of the form in which control unit (storage device control unit) 100 and storage device 300 are housed in relevant boxes. As one form, on both sides of the control unit 100, boxes of storage device 300 are arranged.

In FIG. 2, control unit 100 is equipped with a control terminal (maintenance PC later discussed) 160 at the front center. The control terminal 160 is of a notebook type PC form as one form. The control terminal 160 has a cover, and opening the cover enables the use of the control terminal 160. Below the control terminal 160, slots for mounting circuit boards (blade substrates later discussed) that serve as channel control section 110 are provided. To each slot, one circuit board of the channel control section 110 can be mounted and detached. To the storage system 600, as one form, 8 slots are provided, and to each slot, guide rails for mounting the circuit board are installed. Along the guide rails, circuit boards of channel control section 110 are inserted or removed. In the depth direction of each slot, connectors for electrically connecting the circuit boards of channel control section 110 to control unit 100 are installed, and by connecting the connector section on the circuit board side to the connectors inside the slots, the condition in which circuit boards are connected to the control unit 100 is achieved. By the maintenance personnel and others, circuit boards can be expanded, reduced, or replaced as required.

Disk control section 140, shared memory 120, and others in the control unit 100 are mounted as circuit boards as is the case of the channel control section 110 as one form and attached to the back surface and others of the control unit 100.

To the control unit 100, a plurality of fans 170 are equipped to radiate heat generated from the channel control section 110 and others. Fans 170 are located at the top section of the control unit 100, top of the slots, and the like.

In FIG. 3, the storage system 600 has a configuration primarily comprising a control unit 100 and a plurality of storage device 300. The control unit 100 carries out controls to the storage device 300 in compliance with the command received from the information processing apparatus 200 (PC later discussed) connected through communication means.

For example, the control unit 100 receives I/O requests of data from, for example, the information processing apparatus 200 and carries out processing for input and output of data stored in the storage area of storage device 300. The data is stored in the logical volume/unit (LU), which is a storage area logically set on the physical storage area provided by the disk drive which the storage device 300 has. In addition, the control unit 100 transfers various commands for controlling the storage system 600 to and from the information processing apparatus 200.

The information processing apparatus 200 is a computer equipped with CPU and memory. Various functions are achieved by executing various programs by CPU which the information processing apparatus 200 is equipped with. The information processing apparatus 200 may be, for example, PC (personal computer) or workstation, or may be a mainframe computer.

In FIG. 3, information processing apparatuses 1 through 3 (200) are connected to the control unit 100 via LAN (Local Area Network) 400. LAN 400 may be the Internet or special-purpose network. Communications between information processing apparatuses 1 through 3 (200) and the control unit 100 which are carried out via LAN 400 are conducted in compliance with, for example, TCP/IP protocol. From information processing apparatuses 1 through 3 (200), data access requests (data I/O requests in file units. Hereinafter called the "file access request") are transmitted to the storage system 600 with the file name designated.

To LAN 400, a backup device 910 is connected. The backup device 910 is specifically a disk-based device such as MO, CD-R, DVD-RAM, and others and a tape-based device such as DAT tape, cassette tape, open tape, cartridge tape, and the like. In the backup device 910, the backup data of the data stored in the storage device 300 is stored by communicating with the control unit 100 via LAN 400. In addition, the backup device 910 may be connected to the information processing apparatus 1 (200). In such event, the backup data of the data stored in the storage device 300 is acquired via the information processing apparatus 1 (200).

The control unit 100 is equipped with channel control sections 1 through 4 (110). Hereinafter, let CHN denote channel control sections 1 through 4. The control unit 100 carries out communication with information processing apparatuses 1 through 3 (200) and backup device 910 via LAN 400 by CHN (110). CHN (110) receives file access requests from information processing apparatuses 1 through 3 (200) individually. That is, in CHN (110), network address on LAN 400, for example, IP address, is assigned individually, and each one behaves individually as NAS (Network Attached Storage), and each one of NAS can provide services as NAS to information processing apparatuses 1 through 4 (110) as if independent NAS exists. Because one storage system 600 is configured to have CHN equipped to individually provide services as NAS in this way, the NAS server which used to be individually operated by independent computers can be integrated into one storage system 600. And by this, overall control of the storage system 600 has been enabled, and efficiency of various settings and controls as well as maintenance services such as trouble control and version control can be improved.

CHN (100) of the control unit 100 is achieved by the hardware formed on an integrally unitized circuit board and OS executed by this hardware or application programs that operates on the OS, and other software as later discussed. In this way, the storage system 600, the functions which have been packaged as part of hardware are achieved by software. Consequently, in the storage system 600, flexible system operation has been enabled, and it has become possible to provide carefully thought-out services to diverse and rapidly changing user needs.

Information processing apparatuses 3 to 4 (200) are connected to the control unit 100 via SAN (Storage Area Network) 500. SAN 500 is a network for transferring data to and from information processing apparatuses 3 to 4 (200) in units of block which is a data control unit in the storage area provided by the storage device 300. Communications between information processing apparatuses 3 to 4 (200) and control unit 100 carried out via SAN 500 are, in general, carried out in compliance with the Fiber channel protocol. From information processing apparatuses 3 to 4 (200), the data access request in block units (hereinafter called the "block access request") is transmitted to the storage system 600.

To SAN 500, the backup device 900 that runs under SAN is connected. In the SAN-supported backup device 900, backup data of the data stored in storage device 300 is stored by communicating with the control unit 100 via SAN 500.

The control unit 100 is equipped with channel control sections 5 to 6 (110). Hereinafter CHF denotes the channel control sections 5 to 6. The control unit 100 communicates with the information processing apparatuses 3 to 4 (200) and SAN-supported backup device 900 via SAN 500 by CHF (110).

In addition, information processing apparatus 5 (200) is connected to control unit 100 not through LAN 400, SAN 500 or other networks. Communications between the information processing apparatus 5 (200) and control unit 100 are conducted in conformity to communication protocols, such as FICON (Fiber Connection)®, ESCON (Enterprise System Connection)®, ACONARC (Advanced Connection Architecture)®, FIBARC (Fibre Connection Architecture)®, and the like. From the information processing apparatus 5 (200), the block access request is transmitted to the storage system 600 in compliance with these communication protocols.

The control unit 100 carries out communication with the information processing apparatus 5 (200) by channel control sections 7 to 8 (110). Hereinafter, CHA denotes channel control sections 7 to 8 (110).

To SAN 500, other storage system 610 which is installed at a site (secondary site) remote from the location (primary site) of the storage system 600 is connected. The storage system 610 is utilized as a system for replication or at a site for copying data in the remote copy functions. By the way, the storage system 610 may be connected to the storage system 600 by the communication line such as ATM in addition to SAN 500. In such event, the storage system 610 equipped with an Interface (channel extender) for utilizing the communication line, for example, as the channel control section 110 is adopted.

According to the present embodiment, by mounting with CHN, CHF, and CHA mixed as channel control section 110 in the storage system 600, a storage system connected to dissimilar network can be achieved. Specifically, the storage system 600 is an SAN-NAS integration storage system in which the storage system 600 is connected to LAN 400 by the use of CHN 110 and to SAN 500 by the use of CHF 110.

<Storage Device>

The storage device 300 is equipped with a large number of disk drives (physical disks), and provides a storage area to the information processing apparatus 200. The data is stored in LU, which is a storage area logically set on a physical storage area provided by a disk drive. For the disk drive, for example, hard disk unit, flexible disk unit, semiconductor storage units, and other various units can be used. The storage device 300 may have the disk array configured by, for example, a plurality of disk drives. In such event, the storage area provided to the information processing apparatus 200 may be provided by a plurality of disk drives controlled by RAID.

The control unit 100 may be directly connected with storage devices 300 as illustrated in FIG. 3 or may be connected via a network. Furthermore, storage devices 300 may be configured to be integral with the control unit 100.

Examples of LU set to the storage device 300 include user LU (data device) accessible from information processing apparatus 200, controls by channel control section 110, and others, and system LU (system device) and others used for system control. In addition, to each LU, channel control section 110 is associated with the accessible LU. In addition, the above association may be also achieved by sharing one LU by a plurality of channel control sections 110. By the way, LU shared by a plurality of channel control section 110 is called shared LU, etc.

<Storage Device Control Unit>

The control unit 100 comprises a channel control section 110, shared memory 120, cash memory 130, disk control section 140, control terminal 160, connection section 150, and the like.

Channel control section 110 is equipped with communication interface for carrying out communications with the information processing apparatus 200, and is equipped with the function transferring data I/O commands and others to and from the information processing apparatus 200. For example, CHN 110 accepts the final access request from information processing apparatuses 1 through 3 (200). And by finding the storage address of the file, data length, and others and outputting the I/O request for corresponding to the final access request, access to the storage device 300 is gained. By this, the storage system 600 can provide the service as NAS to the information processing apparatuses 1 through 3 (200). By the way, in the I/O request, the head address of data, data length, reading or writing, and other access classifications are included. In addition, in the case of data writing, the write data may be included in the I/O request. The output of the I/O request is carried out by the IOP (I/O processor) later discussed. In addition, CHF 110 receives the block access request that conforms to the Fiber channel protocol from information processing apparatuses 3 to 4 (200). By this, the storage system 600 can provide high-speed accessible data storage services to information processing apparatuses 3 to 4 (200). In addition, CHA 110 receives a block access request that conforms to the protocol such as FISCON, etc. from the information processing apparatus 5 (200). By this, the storage system 600 can provide data storage services to the mainframe computer such as information processing apparatus 5 (200).

Each channel control section 110 is connected to the internal LAN 151 together with the control terminal 160. By this, it becomes possible to transmit and install the program to be executed by the channel control section 110 from the control terminal 160.

For the channel control section 110, CHN, CHF, CHA, and other kinds are available, but versatility is provided for the size, connector type, and others so that any of the circuit boards of the channel control section 110 can be mounted to each slot which the storage system 600 has. Accordingly, CHN 110 can be mounted to each of a plurality of slots, for example, eight slots. In addition, with four circuit boards set as a group, two kinds of circuit boards can be mounted. Further, with two circuit boards set as a group, four kinds of circuit boards can be mounted. In addition, it is also possible to mount the respectively different circuit boards to eight slots. In addition, as illustrated in FIG. 3, it is possible to optionally combine four CHNs 110 with two CHFs and 2 CHAs, etc. and to mount. Furthermore, it is not always necessary to mount circuit boards to the slots, and they may be kept empty.

The connection section 150 connects the channel control section 110, shared memory 120, cash memory 130, and disk control section 140 mutually. Data and commands transfer between the channel control section 110, shared memory 120, cash memory 130, and disk control section 140 is performed via the connection section 150. The connection section 150 is configured with high-speed bus such as cross bar switches, etc. which carry out data transmission by, for example, high-speed switching. By connecting channel control sections 110 by the high-speed bus, communication performance between channel control sections 110 is improved as compared to the conventional configuration in which NAS servers are connected by LAN. In addition, this enables high-speed file sharing function, high-speed fail-over, and the like.

The shared memory 120 and cash memory 130 are memories shared by the channel control section 110 and disk control section 140. The shared memory 120 is utilized primarily for storing control information, commands, and others, while the cash memory 130 is utilized primarily for storing data (user data).

For example, in the event that the data I/O command which a certain channel control section 110 receives from a certain information processing apparatus 200 is a command, the relevant channel control section 110 not only writes the write command to the shared memory 120 but also writes the write data received from the information processing apparatus 200 to the cash memory 130. On the other hand, the disk control section 140 monitors the shared memory 120 and when it detects that the write command is written in the shared memory 120, the disk control section reads the write data from the cash memory 130 and writes in the storage device 300 in compliance with the relevant command.

Furthermore, in the event that the data I/O command which a certain channel control section 110 receives from a certain information processing apparatus 200 is a read command, the relevant channel control section 110 writes the read command in the shared memory 120 and at the same time, investigates whether or not the read candidate data is present in the cash memory 130. If the read candidate data is present in the cache memory 130, the channel control section 110 transmits the data to the information processing apparatus 200. On the other hand, in the event that no data to be read is present in the cash memory 130, the disk control section 140 which detected that the read command is written in the shared memory 120 by monitoring the shared memory 120 reads the candidate data from the storage device 300 and writes this in the cache memory 130 and at the same time writes the effect in the shared memory 120. And the channel control section 110 detects that the read candidate data is written in the cache memory 130 by monitoring the shared memory 120, the channel control section 110 transmits the data to the information processing apparatus 200.

By the way, in addition to the configuration to indirectly give the data write or data read instructions from the channel control section 110 to disk control section 140 via the shared memory 120, a configuration, for example, to directly give the data write or data read directions from the channel control section 110 to the disk control section 140, not via the shared memory 120, may be adopted.

The disk control section 140 carries out the control of storage device 300. For example, the channel control section 110 writes the data to the storage device 300 in compliance with the data write command received from the information processing apparatus 200. In addition, the data access request to LU by the logical address designation transmitted by the channel control section 110 is converted to the data access request to the physical disk with the physical address designated. In the event that the physical disk in the storage device 300 is controlled by RAID, data access is gained in compliance with the RAID configuration. In addition, the disk control section 140 carries out the duplication management control or backup control for the data stored in the storage device 300. Furthermore, the disk control section 140 carries out control, etc. (replication function or remote copy function) for storing duplication of the data of storage system 600 of the primary site to the storage system 610 of the secondary site for the purposes of data loss prevention at the occurrence of troubles (disaster recovery) or so.

Each disk control section 140 is connected to the internal LAN 151 together with the control terminal 160, and can communicate mutually. This configuration has made it possible to transmit and install the program executed by the disk control section 140 from the control terminal 160.

By the way, in the present embodiment, there described is a configuration in which the shared memory 120 and the cash memory 130 are independently installed to the channel control section 110 and disk control section 140, but it shall not limited to this but the shared memory 120 and cache memory 130 may be distributed and installed to each of the channel control section 110 and disk control section 140. In such event, the connection section 150 mutually connects the channel control section and the disk control section which have the distributed shared memory or cache memory.

<Maintenance and Control Terminal>

Control terminal (maintenance PC) 160 is a computer for carrying out maintenance and control of storage system 600. The maintenance personnel operates the control terminal 160 to carry out various kinds of maintenance and control services. By operating the control terminal 160, it becomes possible to set the physical disk configuration in the storage device 300, or install, etc. the programs to be executed at the channel control section 110, and the like. Now, for the setting of physical disk configuration in the storage device 300, for example, extension or reduction of physical disk, change of RAID configuration (change of RAID level, etc.), and others can be performed. Furthermore, from the control terminal 160, jobs such as confirmation of the storage system 600 operating condition, identification of failure portions, installation of OS to be executed at channel control section 110 and others can be carried out. In addition, the control terminal 160 is connected to an external maintenance center via LAN or telephone line, etc., and should any trouble occur, it can quickly take action. Occurrence of trouble is notified, for example, by OS, application program, driver software, and the like. This notice is given by HTTP, SNMP, electronic mail, and other means. These settings and controls are implemented by an operator with the Web page offered by the Web server which operates at the control terminal 160 used as a user interface. The operator may operate the control terminal 160 and set the subjects and the content to be trouble-monitored, set the address for notifying trouble, and the like.

The control terminal 160 may be of the type to be incorporated in the control unit 100 or may be externally mounted. In addition, the control terminal 160 may be made in a form of computer which is dedicated to maintenance and control of the control unit 100 and storage device 300 or in a form to provide general-purpose computer with the maintenance and control functions.

The control terminal 160 comprises CPU, memory (RAM), ports (communication interface), storage medium reader, input units (keyboard, mouse, etc.), output units (display, etc.), and storage system (hard disk drive, etc.). The CPU administers the control of the whole control terminal 160. By CPU which runs programs stored in the memory, functions as the Web server are achieved. In the memory, information and data for maintenance and control, for example, physical disk control tables, LU control tables, and others are stored. The storage medium reader is a device for reading programs and data stored in the storage medium. In the case of the present embodiment, as a storage medium, in an FD (flexible disk) 31 later discussed, BIOS update program 22 and new BIOS image 23 are stored. Besides FD 31, CD or semiconductor memory, etc. may be used. The data read from the storage medium by the storage medium reader is stored in memory or storage unit. For example, the BIOS update Program 22 and new BIOS image 23 stored in FD 31 are read through the storage medium reader and are stored in memory or storage unit. The ports are connected to internal LAN 151, and can be communicate with circuit boards of channel control section 110, disk control section 140, and the like. In addition, the ports may be connected to LAN 400, telephone line, and the like.

Embodiment 1

Figure 4:
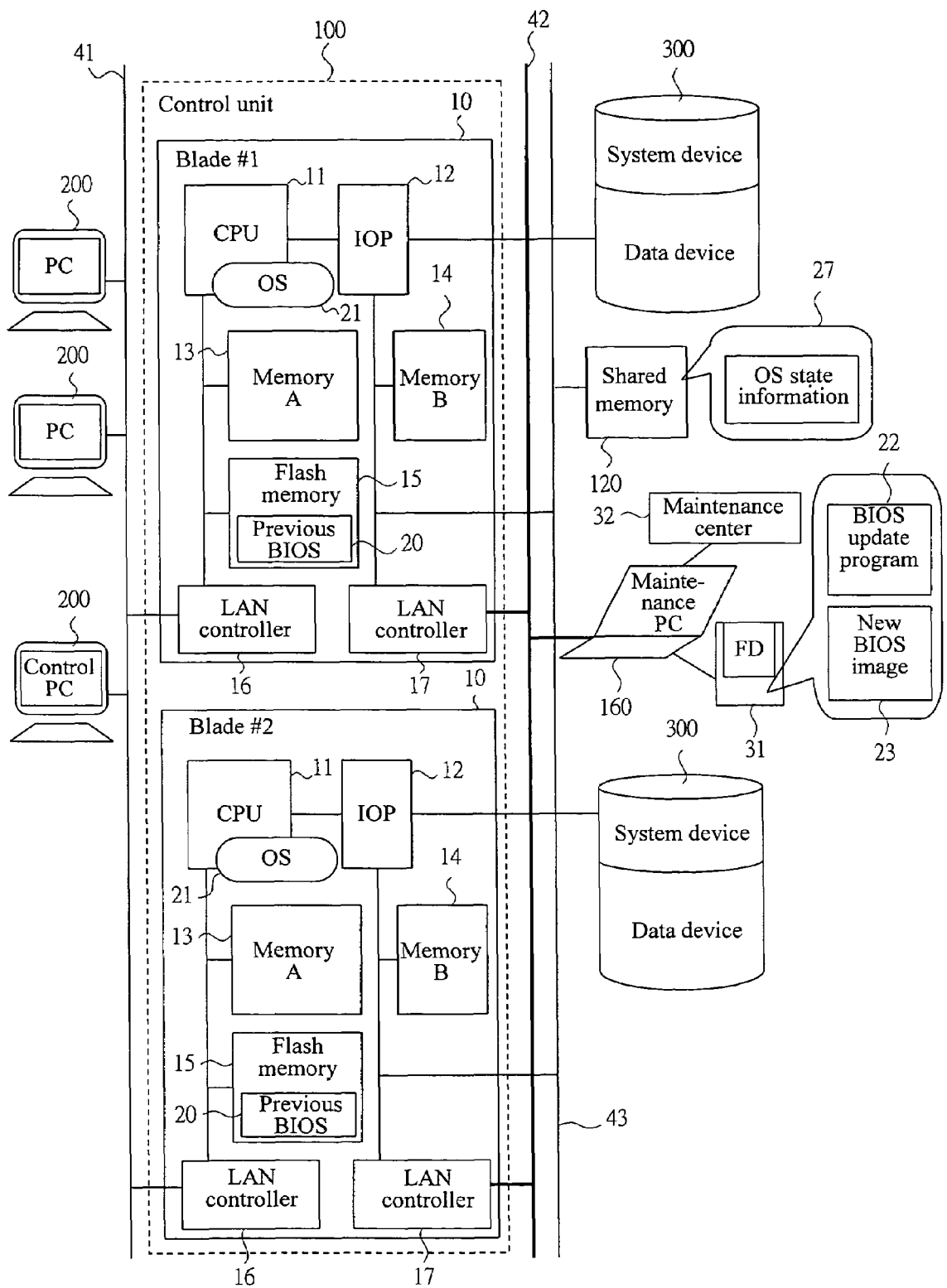
FIG. 4 is a diagram illustrating a functional block configuration of the whole computer system including the storage system in embodiment 1 according to the present invention.

Now the description will be made on the storage system in embodiment 1 according to the present invention. FIG. 4 illustrates a functional block configuration of the whole computer system including the storage system in embodiment 1 according to the present invention. In the present figure, in particular, portions involved in updating the firmware held by circuit boards composing the control unit 100 are primarily illustrated.

In the firmware update method (to be called the first firmware update method) at the storage system of embodiment 1, the firmware is updated by the use of the control terminal 160 with special emphasis placed on the control at IOP in the circuit boards that compose the control unit 100. The circuit boards form a cluster with the circuit board targeted for the update of the firmware included in the control unit 100. By executing properly fail-over for taking on services between circuit boards in the cluster, the firmware of each circuit board is updated with services to the client information processing apparatus 200 being continued.

In FIG. 4, blade #1 and blade #2 (10) which are blade substrates (hereinafter called the "blade") that compose the control unit 100 corresponds to the channel control sections 110, respectively. Hereinafter, the number for identification will be expressed by "#." In the present figure, two blades 10 only are shown as cluster configuration, but it is possible to configure a cluster later discussed by a plurality of blades 10. In addition, elements other than blade 10 such as shared memory 120, which compose a control unit 100 indicated by a dotted-line frame, are shown outside the dotted line frame. Each blade 10 is connected to the storage device 300 through physical and logical paths, and controls the processing concerning data storage. Each blade 10 furnishes file server and other services to client PC 200.

PC (and control PC) 200 corresponds to the information processing apparatus 200. PC 200 is a computer which the relevant computer system users utilize for regular services, etc. PC 200 transmits an access request to the blade 10 which functions as an individual server, respectively, via the first network 41 and reads/writes the data for the storage device 300 via the processing at blade 10.

Control PC 200 is one of the PCs 200 and is a computer which the user-side administrator of the relevant computer system can use for control of the storage system. From the control PC 200, control functions for executing fail-over (service move) later discussed and others can be utilized on the special-purpose software (control program), and based on the direction entries by the user-side administrator, fail-over directions, etc. can be given to he blade 10.

Maintenance PC (control terminal) 160 is a computer which the maintenance personnel on the operating side of the computer system containing the storage system uses. The maintenance PC 160 communicates with each blade 10 through the second network and executes the processing related to maintenance and control. The maintenance PC 160 can communicate particularly with IOP 12 of each blade through LAN controller 17. In particular, in the case of embodiment 1, the firmware which each blade 10 holds is updated from the maintenance PC 160. The hardware configuration of maintenance PC 160 is as per described before. The maintenance PC 160 reads the data from FD 31. FD 31 stores the BIOS update program 22 and new BIOS image 23 in memory. In addition, the maintenance PC 160 is connected to the maintenance center 32 for general maintenance and control of the present storage system and the computer system through the communication line. The maintenance PC 160 can also download and acquire the BIOS update program 22 and new BIOS image 23 from the maintenance center 32.

Maintenance PC 160 provides a user interface for jobs related to firmware update. That is, the maintenance PC 160 carries out, on the basis of the communication with IOP 12 of the blade 10, update control processing for inputting and outputting the information that expresses the service move processing and firmware update processing condition and the information for the directions. For example, it displays directions of service move, service move completion condition, firmware update completion condition, and others, and issues firmware update directions and others to blade 10 on the basis of operations and entries of the maintenance personnel.

The first network 41 is a network primarily for providing services to PC 200 and corresponds to the above-mentioned LAN 400 or SAN 500, and the like. Through the first network 41, communication is possible between PC 200 and blade 10.

The second network 42 is a network primarily for maintenance and control of the storage system, and corresponds to the above-mentioned internal LAN 151. The second network 42 is connected to the maintenance PC 160. Through the second network 42, communication is possible between the maintenance PC 160 and IOP 12 of each blade 10.

The internal bus 43 is a bus connecting the blade 10 and each circuit board containing the shared memory 120 inside the control unit 100 and corresponds to the connection section 150. Through the internal bus 43, IOP 12 and the shared memory 120 can communicate with each other. In particular, IOP 12 stores various kinds of information such as OS state information 27 later discussed and others in the shared memory 120 and refers to the information as required.

The shared memory is packaged as, for example, one circuit board, and mounted in a logical box of the storage system same as the blade. In the storage system, each blade and shared memory are connected to each other by bus via IOP.

In the embodiment 1, programs for achieving various kinds of processing related to update of firmware later discussed are executed at CPU of the maintenance PC 160, CPU of the control PC 200, and blade 10, in particular IOP 12 and CPU 11.

<Blade Substrate>

The hardware of blade (#1, #2) 10 has a configuration with CPU 11, IOP 12, memory A13, memory B14, flash memory 15, LAN controllers 16, 17, bus to connect these, and others formed on a substrate.

In the case of the present embodiment, blade 10 is a circuit board corresponding to the channel control section 110 but this is the same for other embodiments in which the control unit 100 of the storage system comprises the channel control section 110, disk control section 140, and the like. That is, the configuration of blade 10 in the present embodiment indicates a general configuration as a circuit board that composes the control unit 100 of the storage system.

CPU 11 controls the whole blade 10. By OS 21 which operates on CPU 11, CPU 11 carries out each processing including providing services to client PC 200. CPU 11 is connected to IOP 12 by bus and carries out communication. CPU 11 primarily uses memory A13 for its jobs.

OS (#1, #2) 21 operates on CPU 11. OS 21 is booted in compliance with BIOS (previous BIOS) 20 on flash memory 15 as the power supply of blade 10 is turned on. OS 21 shall be the software which includes not only the OS portion that serves as a basis but also host application programs such as file system, RAID control program, maintenance and control program, trouble control program, NAS control program, and the like. OS 21 is stored and controlled in the system device area of, for example, storage device 300.

IOP 12 is a processor which transfers data and commands to and from the disk control section 140, cash memory 130 or shared memory 120, and maintenance PC 160. IOP 12 can directly communicate with CPU 11, and relays communication between CPU 12 and disk control section 140 and storage device 300. IOP 12 uses primarily memory B14 for its jobs. IOP 12 carries out not only I/O processing to storage device 300 but also processing such as trouble monitoring of CPU 11, etc. IOP 12 is composed of, for example, one-chip micro computer.

Memory A13 is RAM, in which various programs and data are stored. Examples include the program that composes OS 21 which operates on CPU 11, in particular, the program for servicing client PC 200, the program for fail-over functions later discussed, data transferred to and from PC 200 or IOP 13, and the like. As the data for services for the client, there are, for example, metadata for a file system, lock tables for exclusive access control of files, and the like. In the metadata, LU address in which, for example, file data is stored, data size, and other information are included. In the lock table, the access-denied information in file units or LU units is included.

Memory A14 is RAM, in which various programs and data are stored. For examples, the data which IOP transfers to and from CPU 11 and storage device 300, data which IOP 12 transfers to and from maintenance PC 160, and date are stored.

By the way, in the present embodiment, two memories A13 and B14 are provided for the memory for jobs in the blade 10, but it may not be limited to this but a configuration to share a single memory by CPU 11 and IOP 12 or others are available.

Flash memory 15 is nonvolatile memory which can hold the data even when electric power is interrupted, and in the storage area, the firmware including BIOS (previous BIOS) 20 is written and held. Even when the power supply is turned off in the blade 10, the firmware including BIOS 20 is held and when the power supply is turned on in the blade, the firmware including BI 20 is first booted. In the condition of FIG. 4, BIOS 20 in the blade 10 is previous BIOS in the state before update. New BIOS of a newer version than previous BIOS 20 is included in new BIOS image 23.

The firmware is a program which includes BIOS 20 that initializes hardware around CPU 11 or boots OS 21, and is executes by CPU 11 when the blade 10 is booted. The code in BIOS 20 is a boot code used before BIOS 21 is booted. By updating, that is, rewriting the relevant firmware, the operation and functions of the blade 10 and storage system are updated.

LAN controller 16 is equipped with a communication interface which is connected to the first network 41 and enables communication with PC 200. For example, when the blade 10 is CHN 110, LAN controller 16 communicates with PC 200 in compliance with the TCP/IP protocol. The access request from PC 200 is processed by CPU 11 via the processing at LAN controller 16.

For example, in the event that the blade 10 is a circuit board which particularly corresponds to CHN 110, the blade 10 which is CHN 110 receives the file access request from PC 200 via the first network 41 and provides services as NAS by OS 21 which operates on CPU 11.

LAN controller 17 is equipped with a communication interface which is connected to the second network 42 and enables communication with maintenance PC 160. The request from maintenance PC 160 is processed by IOP 12 via the processing at LAN controller 17.

In the OS 21, the file system controls the association between the file name designated by the file access request and LU. The RAID control program carries out processing such as setting, etc. related to RAID control. The maintenance and control program provides services related to maintenance and control to maintenance PC 160 on the basis of the request from maintenance PC 160. For example, the setting contents of LU and RAID are displayed, settings from maintenance PC 160 are reflected, and the like is carried out. As processing related to trouble measures of the storage system, the trouble control program carries out fail-over control, etc. between blades 10 that compose the cluster. The NAS control program is a program which carries out confirmation of operating condition, setting, controls, and others for the storage system. The NAS control program has a function as a Web server and provides the setting Web page for carrying out settings and controls of the storage system from control PC 200, etc. That is, the setting Web page is response-transmitted in accordance with the HTTP request from control PC 200. In control PC 200, the setting Web page is displayed and entry operation of settings and controls related to the storage system is carried out by the user of control PC 200 (system administrator, etc.). The content which can be set through the setting Web page includes, for example, LU control, backup control, copy control, cluster configuration control (correspondence relation in fail-over, fail-over method, etc.), OS 21 version control, security control, and the like. The NAS control program executes corresponding settings and controls on the basis of the information entered and transmitted from control PC 200 through setting Web page.

<Cluster Configuration>

Figure 5:
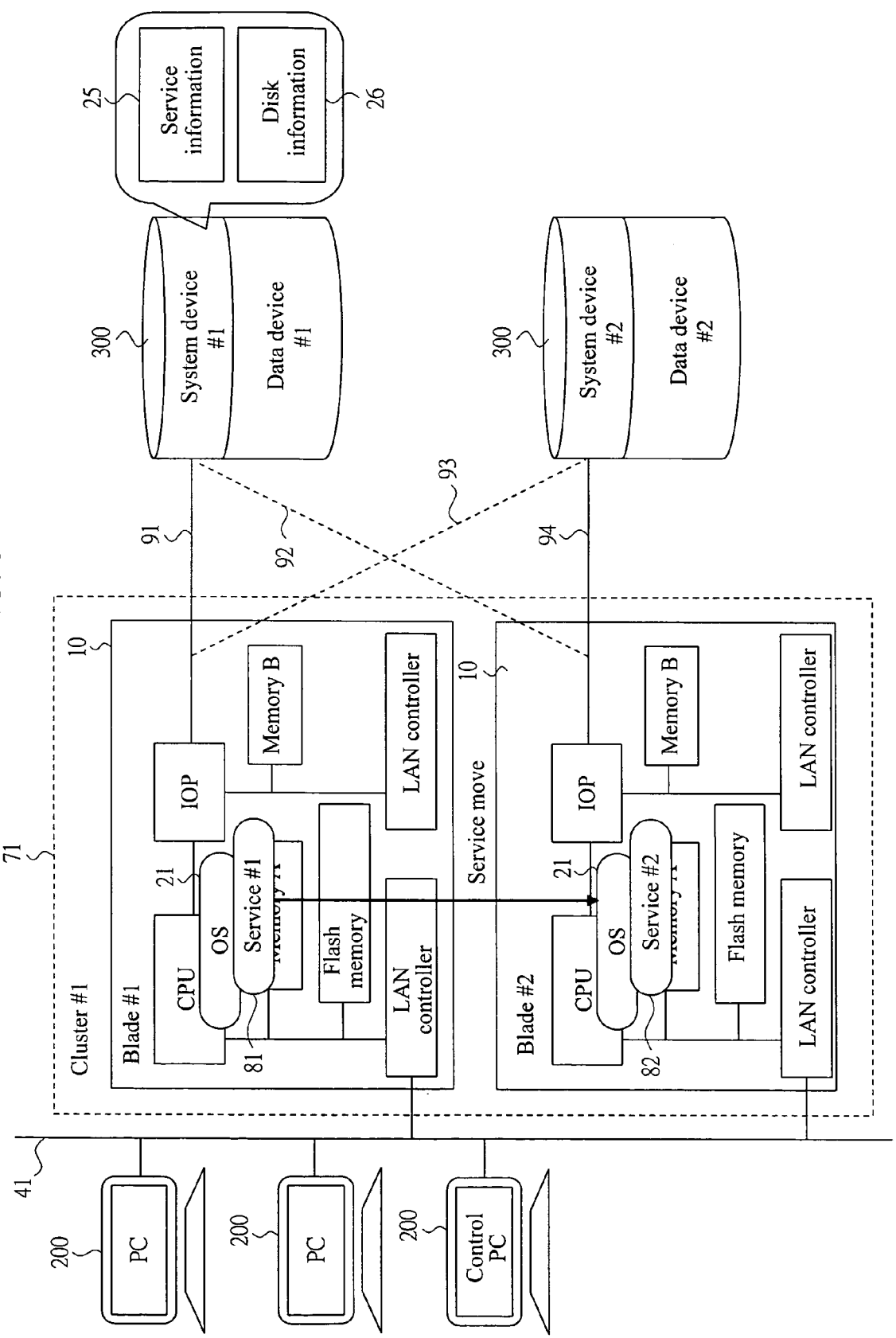
FIG. 5 is an illustration on the cluster configuration of a blade substrate in the storage system in embodiment 1 according to the present invention.

FIG. 5 is an illustration that shows the cluster configuration of blades 10 in the storage system of embodiment 1. A plurality of blades 10 form a cluster. In this section, an example in which a cluster is formed by blades 10 which are two sheets of CHN 110 is shown. Cluster #1 (71) is formed by two blades, blade #1 and blade #2. It is possible to carry out fail-over between blades 10 that form a cluster by the fail-over function in the trouble control program. By adopting the cluster configuration, even if any trouble occurs in the blade 10 in the cluster, fail-over processing can be carried out, in which the processing which the trouble-caused blade 10 has carried out to that time, for example, service to the client, can be taken on by the other blade 10 in the cluster. The handover of the processing between circuit boards in the cluster is called fail-over in the present embodiment. Even when any trouble does not particularly occur, fail-over can be implemented on the basis of the directions from maintenance personnel or user-side administrator. In addition, in the fail-over functions, a function to return the service taken on to other blade 10 by implementing fail-over to the blade (original blade) 10 which originally provided the service (fail-back function) is included. In the present embodiment, using this kind of fail-over functions, firmware is updated.

First of all, description will be made on the fail-over processing executed when any trouble occurs. Assume that to client PC 200, service #1 (81) is provided by OS 21 of blade #1 (10), while service #2 (82) is provided by OS 21 of blade #2 (10). For example, in the event that any trouble occurs in blade #1 (10) and service #1 (81) to the client is unable to be continued at OS 21, fail-over processing to hand over the service #1 (81) carried out to that time to OS 21 of blade #2 (10) automatically takes place. In addition, fail-back processing to return the service #1 (81) from blade #2 (10) to OS 21 of blade #1 can be carried out after blade #1 (10) recovers from the trouble.

Blades 10 (#1, #2) that form a cluster run the trouble control program and write in the shared memory 120 that their processing is normally carried out. And the blades mutually check the presence or absence of the writing of the other party blade. In the event that the writing of the other party blade is unable to be detected, the blade decides that any trouble occurred to the other blade and executes the fail-over processing. The service hand-over at the time of fail-over implementation is carried out via shared LU on the storage device 300.

Each blade 10 which composes a cluster can control accessible PC 200. Each blade should receive the access request from the accessible PC 200 only. The control of accessible PC 200 is carried out by allowing the memory A13 in blade 10 or system device of the storage device, etc. to store the address information of access-permitted PC 200, that is, IP address, etc. By this, even in the configuration in which a plurality of PC 200 are connected to the storage system via the first network 41 such as same LAN 400, etc., LU can be assigned exclusively to each of PC 200. The above setting can be carried out from the maintenance PC 160 or PC 200. The setting can be carried out from PC 200 by utilizing the setting Web page displayed on PC 200 by the NAS control program which operates on blades 10.

Between blades 10, communication for monitoring the other blade condition is carried out via the first network 41. By this, it becomes possible to recognize the condition of each blade 10 and detect trouble. For the communication for monitoring the condition of blade 10, heart-beat communication is carried out. In the heart-beat communication, the heart-beat information is periodically transmitted between blades 10, and if no response is received, it is decided that any trouble occurs in the relevant blade.

In the fail-over function, the processing to hand over the services to other blade 10 can be automatically or manually performed between blades 10, when one blade go down due to trouble, etc. In addition, the processing to return the handed over service to the blade which went down can be automatically or manually performed when the blade which went down is recovered. In the event that fail-over is carried out manually, the return of the service is directed by the maintenance PC 160 or control PC 200 and is executed.

For the interface between blade 10 and storage device 300, passes 91, 94 shown by solid lines are passes at the normal time. At the time of fail-over, passes 92, 93 shown in broken lines are made effective. For example, assume that during the normal time, blade #1 carries out service #1 by the use of data device #1 of storage device 300 while blade #2 carries out service #2 by the use of data device #2 of storage device 300. In the event that the service #1 is taken on by blade #2 by executing fail-over under this condition, blade #2 that takes on service #1 gains access to data devices #1, #2 of both storage devices 300 through broken-line pass 92.

For the interface between blade 10 and PC 200, by taking on the IP address information for service between blades 10 at the time of fail-over, the client PC 200 can continuously receive the service without being aware of that the server, that is, blade 10, went down.

To the system device on the storage device 300 of the storage system, service information 25 which is the control information including IP address information, etc. for services between the blade 10 and PC 200, disk information 26 which is the control information for controlling the pass and mount condition between the blade 10 and storage device 300, and others are stored.

<A Plurality of Clusters>

Figure 6:
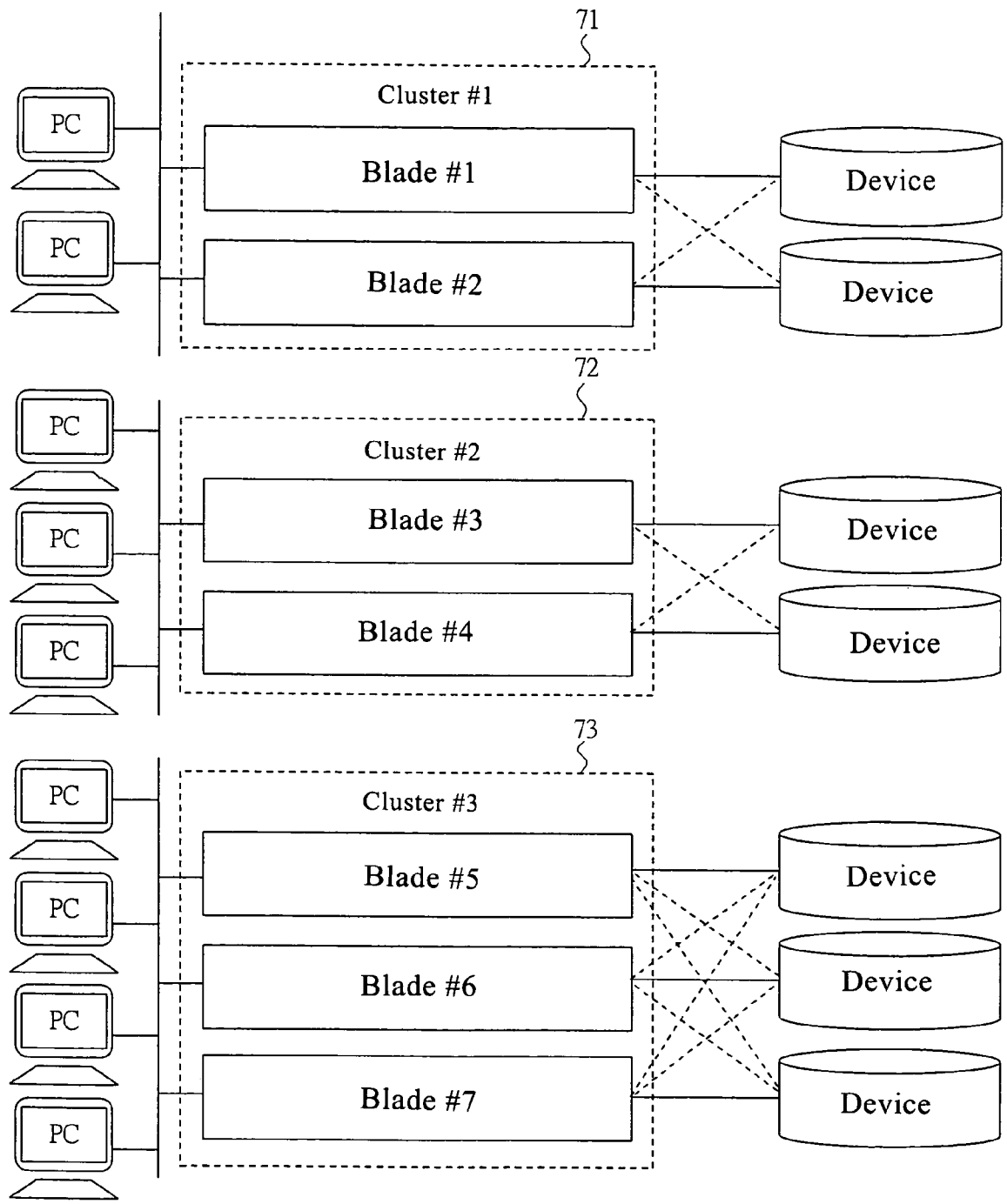
FIG. 6 is an illustration showing an example that configures a plurality of clusters by a plurality of blades in the storage system in embodiment 1 according to the present invention.

FIG. 6 is an illustration indicating an example for forming a plurality of clusters with a plurality of blades 10 in the storage system according to embodiment 1. It is possible to group blades 10 that form control unit 100 into several clusters. For example, one cluster is assigned to a functional unit of a company which utilizes the computer system including the present storage system. In FIG. 6, as an example of grouping clusters, a case in which three clusters of cluster #1 through cluster #3 are formed is shown. Cluster #1 (71) has a configuration to include blade #1 and blade #2. Cluster #2 (72) has a configuration to include blade #3 and blade #4. Cluster #3 (73) has a configuration to include blade #5 through blade #7.

For example, blades 10 to be mounted to each slot which the storage system has can form clusters by a plurality of same kind of channel control sections 110. For example, with two CHN 110 set as a pair, clusters can be formed.

The control unit 100 has two power supply systems for improved reliability, and the 8 slots to which blades 10 which form channel control section 110 are mounted are divided into 4 slots each for each power supply system.

Therefore, when a cluster is formed, if channel control section 110 of both power supply systems is included, even when any trouble occurs in one power supply system and the power supply is stopped, the power is continuously supplied to the channel control section 110 that belongs to the other power supply system in the same cluster, and the processing can be taken on by the relevant channel control section 110.

<Control Information for Services>

FIG. 7 and FIG. 8 are tables that indicate the control information for services to be held in the system device on the storage device 300 of the storage system according to embodiment 1. For the control information involved in the service provided by OS 21, for example, information such as IP address, etc. for services is stored in the area of system device on the storage device 300. FIG. 7 shows a table that holds the service information 25 which is the control information for allowing the blade 10 to communicate with PC 200 and to provide services. FIG. 8 is a table for holding the disk information 26 which is the control information for controlling the storage device 300 and LU involved in providing the said services. These tables can be referred from the maintenance PC 160 and control PC 200.

In FIG. 7, the service information 25 has the blade 25a, host name 25b, service IP address 25c, original blade 25d, and service condition 25e as data items. The blade 25a is blade identification information. The blade 10 shown by blade 25a provides service to client PC 200 by the IP address shown by service IP address 25c as the host shown by host name 25b. The service condition 25e indicates the condition such as "in service" or "out of service," etc. The original blade 25d indicates the original service provider, and is used to judge to which IP address and device the service should be returned when fail-back is carried out. As an example, as shown in the upper table in FIG. 7, blade #1 ("Blade1") has the host name of "Server1," service IP address of "192.168.1.10," and is "in service" to PC 200. Similarly, blades #2 and #3 are "in service" for PC 200, respectively. From this condition, as described later, for updating the firmware of blade 10, service is moved by executing fail-over to temporarily shut down (out of service) the blade 10. As shown in the lower table of FIG. 7, by execution of fail-over, the blade #1 is temporarily shut down to bring into the "out of service" condition, and blade #2 is made to take over the service of "Server1" of blade #1 and enters the "in service" condition.

In FIG. 8, the disk information 26 has the blade 26a, device 26b, mount condition 26c, and original blade 26d as data items. The blade 26a is device identification information. The blade 10 shown by blade 26a is mounted or unmounted to a physical volume or logical volume shown by device 26b. The mount condition 26c indicates the condition to the device such as "mounted" or "unmounted," etc. The original blade 26d indicates the original service provider. As an example, as shown in the upper table in FIG. 8, blade #1 ("Blade1") is being mounted to devices "Disk1," "Disk2" and is providing the service. From this condition, as shown in the lower table of FIG. 8, blade #1 is shut down by executing the fail-over, unmounted from devices "Disk1," "Disk2" to bring it into the "unmounted" condition and at the same time mounts the devices "Disk1," "Disk2" to blade #2 to allow blade #2 to take over the service in which the original blade 26d is blade #1, and brings the blade #2 into the "mounted" condition.

<General BIOS Update Procedure>

For comparison, the conventional general BIOS update processing procedure in PC (personal computer) is briefly described. PC should have CPU, memory (RAM), flash memory that holds previous BIOS, and other general elements such as I/O units, etc. The processing procedure when the previous BIOS on the flash memory to the new BIOS using an FD (flexible disk) in which the new BIOS image and the BIOS update program are recorded is described as follows. The new BIOS image is a data including new BIOS codes, and the BIOS update program is the program that describes the processing for updating BIOS. When the PC power supply is turned on, the previous BIOS on flash memory is booted. The previous BIOS detects the FD from the FD drive and loads the BIOS update program recorded in the FD to RAM. The previous BIOS transfers the control to the loaded BIOS update program. Then, the BIOS update program loads the new BIOS image in the FD to RAM and writes the loaded new BIOS image on the previous BIOS of flash memory. By this, the BIOS codes in PC are updated but the system of the relevant PC has BIOS update not yet made effective. Then, the BIOS update program resets CPU from hardware and reboots the system. Rebooting the system boots the new BIOS on flash memory to make the BIOS update effective.

<First Firmware Updating Method>

Referring now to FIG. 4, the first firmware updating method in the storage system in embodiment 1 will be described. In the first firmware updating method, the firmware is updated using the maintenance PC 160 with special emphasis placed on the control at IOP 12 of blade 10. A cluster is formed with the firmware update candidate blade 10 included. IOP 12 and maintenance PC 160 communicate each other through the second network 42. The maintenance PC 160 can gain access to all the blades 10 which are subject to firmware update through the second network 42. The shared memory 160 is shared by IOP 12 of all the blades 10 and is accessible for data read/write. The directions for fail-over to OS 21, that is, service move, are executed by the user-side administrator by entering the directions from the control PC 200. The control PC 200 is operated by the user-side administrator. As an example of firmware update candidate blade 10, the blade #1 and blade #2 are chosen for candidates from a plurality of blades 10 connected to the control unit 100.

In the first firmware updating method, a plurality of processing methods shown below may be further selectively used.

<First Firmware Updating Method—First Processing Method>

Figure 9:
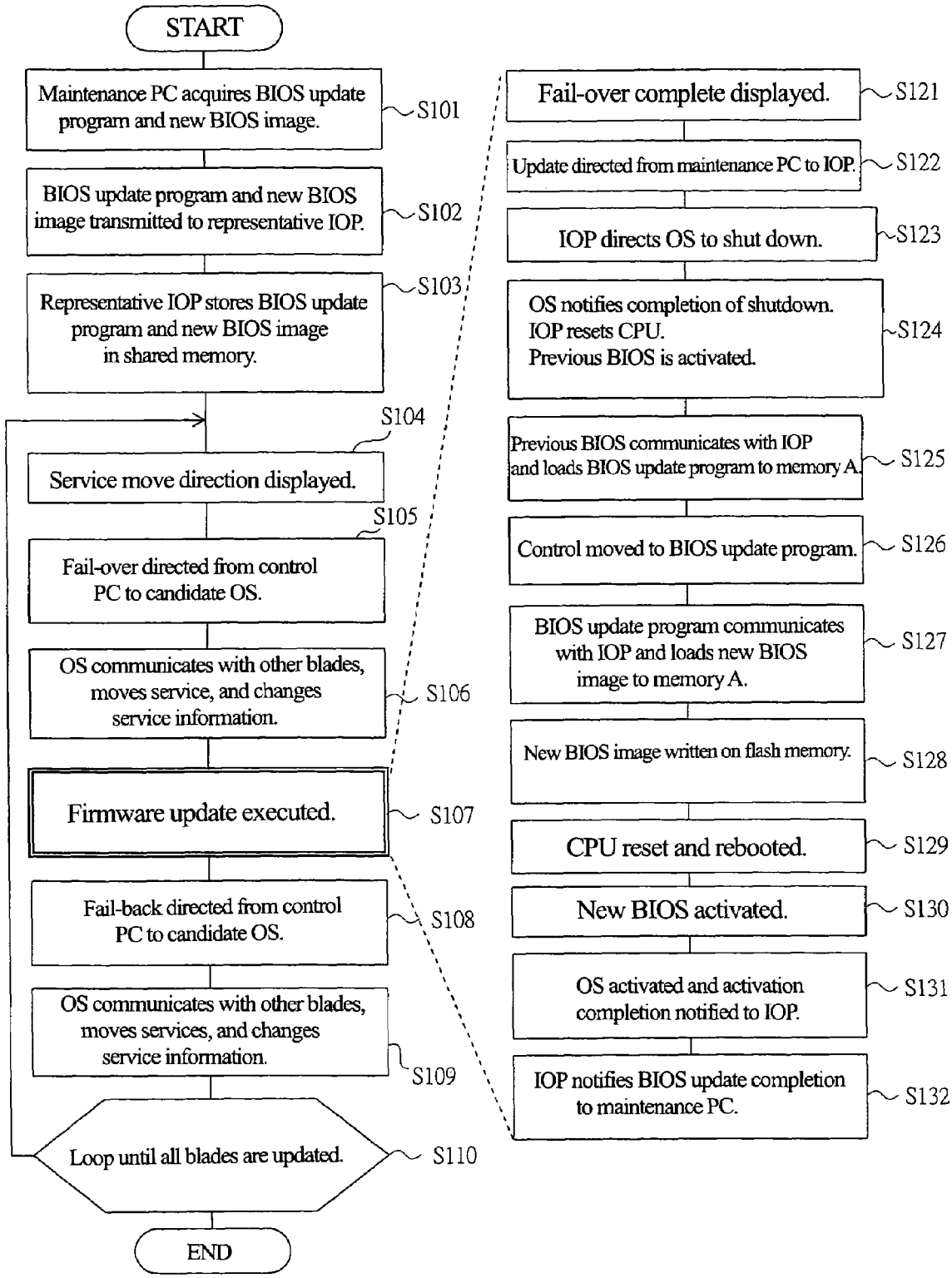
FIG. 9 is a flow chart indicating the processing procedure corresponding to the first processing method of the first firmware update method in the storage system in embodiment 1 according to the present invention.

FIG. 9 is a flow chart showing the processing procedure that corresponds to the first processing method of the first firmware updating method. In the first processing method of the first firmware updating method, the operator (maintenance personnel and user-side administrator) intervenes to execute fail-over by manual operation and with the communication for service to client PC 200 being continued, the firmware of each blade 10 is updated. In addition, with the directions from the control PC 200 via the first network 41 used as a starting point, fail-over is carried out to update the firmware. Now, as an example, the firmware update processing is carried out in order of blades #1 and #2.

First of all, the maintenance PC 160 reads the BIOS update program 22 and new BIOS image 23 from FD 31 or downloads from the maintenance center 32 and acquires them in the memory area inside the maintenance PC 160 (Step S101). Then, from the maintenance PC 160, communication is made through the second network 42 to IOP 12 of the blade 10 optionally selected from the firmware update candidate blade 10, BIOS update program 22 and new BIOS image 23 are transmitted and stored in memory B14 (S102). Of the firmware update candidate blades 10, IOP 12 to which BIOS update program 22 and new BIO image 23 are transmitted is hereinafter called the representative IOP 12. The representative IOP 12 may be chosen automatically or manually.

Then, the representative IOP 12 of chosen blade 10 carries out the processing to store (copy) the BIOS update program 22 and the new BIOS image 23 received from the maintenance PC 160 and stored in memory B14 (S103). This storing processing is the processing to enabling other blades 10 to use the BIOS update program 22 and the new BIOS image 23 from the shared memory 120.

Upon completion of the above processing, through the communication at the second network 42, the service move direction (fail-over direction) is displayed on the output unit screen of the maintenance PC 160 (S104). This direction is the direction to execute the service handover to other blades 10 in the relevant blade 10 as the pretreatment in order to start execution of the firmware update processing in the firmware update candidate blade 10. The maintenance personnel recognizes this direction on the maintenance PC 160 and directs the user-side administrator that uses the control PC 200 to carry out fail-over operation.

The user-side controller transmits, on the basis of the direction from the maintenance personnel side (S105), the fail-over direction from the software on the control PC 200 to OS 21 on the blade 10 which is subject to the start of execution of the firmware update processing. OS 21 of blade 10 which received the fail-over direction communicates with OS 21 of other blades 10, and carries out the service move processing for allowing other OS 21 to take over the service being provided by its own OS 21. As a result of the service move, the relevant blade 10 changes the control information related to the services provided, such as the service information 25, disk information 26, and the like, held in the system device of the storage device 300 (S106). In the service move processing, all the services in the blade 10 (for example, blade #1) which is subject to the start of execution of firmware update processing are taken over to other blade 10 (for example, blade #2) which are not subject to the start of execution of firmware update processing, and the relevant blade 10 is temporarily brought to down condition.

When fail-over, that is, service move, is completed in the blade 10 subject to the start of execution of the firmware update processing by the processing up to S106, execution of firmware update processing is started in the blade 10 subject to the start of execution of the firmware update processing in S107.

In firmware update processing of S107, first of all, by the processing up to S106, the information which notifies that fail-over in the blade 10 subject to the start of execution of the firmware update processing has been completed by the processing up to S106 ("fail-over completion"), that is, the information to notice the state capable of starting firmware update processing, is displayed on the maintenance PC 160 screen through communication at the second network 42. The maintenance personnel begin execution of firmware update processing of the relevant blade 10 after recognizing the "fail-over completion" on the maintenance PC 160 (S121).

The maintenance personnel transmit the BIOS update direction from the maintenance PC 160 to IOP 12 of the firmware update processing execution candidate blade 10 (for example, blade #1) through the second network 42 (S122). IOP 12 of the blade 10 gives shutdown directions to OS 21 which operates on CPU 11 when it receives the BIOS update direction from the maintenance PC 160 (S123). OS 21 which received the shutdown carries out shutdown processing and at the end of the processing gives the shutdown completion notice to IOP 12. IOP 12 resets CPU 11 from the hardware after it receives the shutdown completion notice from OS 21. As a result, the previous BIOS 20 on flash memory 15 is booted (S124).

The previous BIOS 20 booted by resetting the CPU 11 communicates with IOP 12 and loads into the memory A13 the BIOS update program stored in memory B14 (S125). And the previous BIOS 20 moves the control to the BIOS update program 22 (S126).

The BIOS update program 22 communicates with IOP 12 and loads into the memory A13 the new BIOS image 23 stored in the memory 14 (S127). The BIOS update program 22 writes the new BIOS image 23 loaded into the memory A13 on the previous BIOS 20 of flash memory 15 and updates (S128). The BIOS update program 23 resets CPU 11 from the hardware and reboots the system of the blade 10 (S129). By resetting the CPU 11, the new BIOS on the flash memory 15 is booted (S130).

By the processing by the booted new BIOS, OS 21 is started. After the completion of start of OS 21, OS 21 notifies the start completion to IOP 12 (S131). IOP 12 which received the start completion notice from OS 21 notifies BIOS update completion to the maintenance PC 160 through the second network 42 (S132). This concludes the firmware update processing in the candidate blades 10.

When no BIOS update program 22 or new BOIS image 23 is stored in the memory B14 of the blade 10 in S125, the data stored in the shared memory 120 (data storage-processed by the representative IOP 12 in S103) is referred and acquired.

After the completion of firmware update processing of the firmware update processing execution start candidate blade (for example blade #1) in S107, the maintenance personnel recognize the firmware update completion on the maintenance PC 160. The maintenance personnel directs the user-side administer to carry out fail-over operation, that is, fail-back operation, for returning services to the blade 10 completed with the firmware update processing.

The user-side administrator transmits the fail-back direction to return the service to the original blade (for example, blade #1) from control PC 200 to OS 21 of the relevant blade 10 (S108). The fail-back direction is transmitted to OS 21 of the blade 10 (for example, blade #1) completed with the firmware update processing or to OS 21 of the blade 10 (for example, blade #2) which took over the service for the update processing. OS 21 of the relevant blade 10 which received the fail-back direction communicates with other blades 10 to carry out service mode processing, and changes the service information 25 and the disk information 26 of the system device (S109). By the service move processing, the service which had been provided before the firmware updating is returned to OS 21 of the blade 10 after the completion of firmware update processing, that is, OS 21 of the blade 10 for which the new BIOS has been made effective. At the time of the fail-back, service handover processing for subsequent firmware upgrade processing may be carried out concurrently (for example, service #2 of the blade #2 is moved to blade #1).

By the processing from S104 to S109, firmware update processing in one of the firmware update candidate blades 10 is completed. These pieces of processing are repeated until firmware update is completed in all the blades 10 which are subject to firmware updating (S110).

By the way, various kinds of handover methods are possible to hand over the services between a plurality of blades 10 for firmware updating as far as the procedure for temporarily handing over all the services implemented by the firmware update processing execution candidate blade to other blade 10 and executing the firmware update processing is satisfied. For example, under the conditions in which OS 21 of blade #1 implements service #1 and OS 21 of blade #2 implements service #2, first of all, service #1 of OS 21 of blade #1 is moved to OS 21 of blade #2 and BIOS of blade #1 is updated. And as soon as the service #1 is returned from blade #2 to OS 21 of blade 1, service #2 of OS 21 of blade #2 is moved to blade #1 and BIOS of blade #2 is updated.

In addition, in the firmware update processing from S104 to S109, firmware update processing of a plurality of blades 10 may be implemented simultaneously. That is, a plurality of blades 10 which are subject to simultaneous execution of firmware update processing are chosen from the maintenance PC 160, control PC 200, and the like, the fail-over is directed, and processing of S107 is simultaneously started on a plurality of blades 10.

<First Firmware Updating Method—Second Processing Method>

Figure 10:
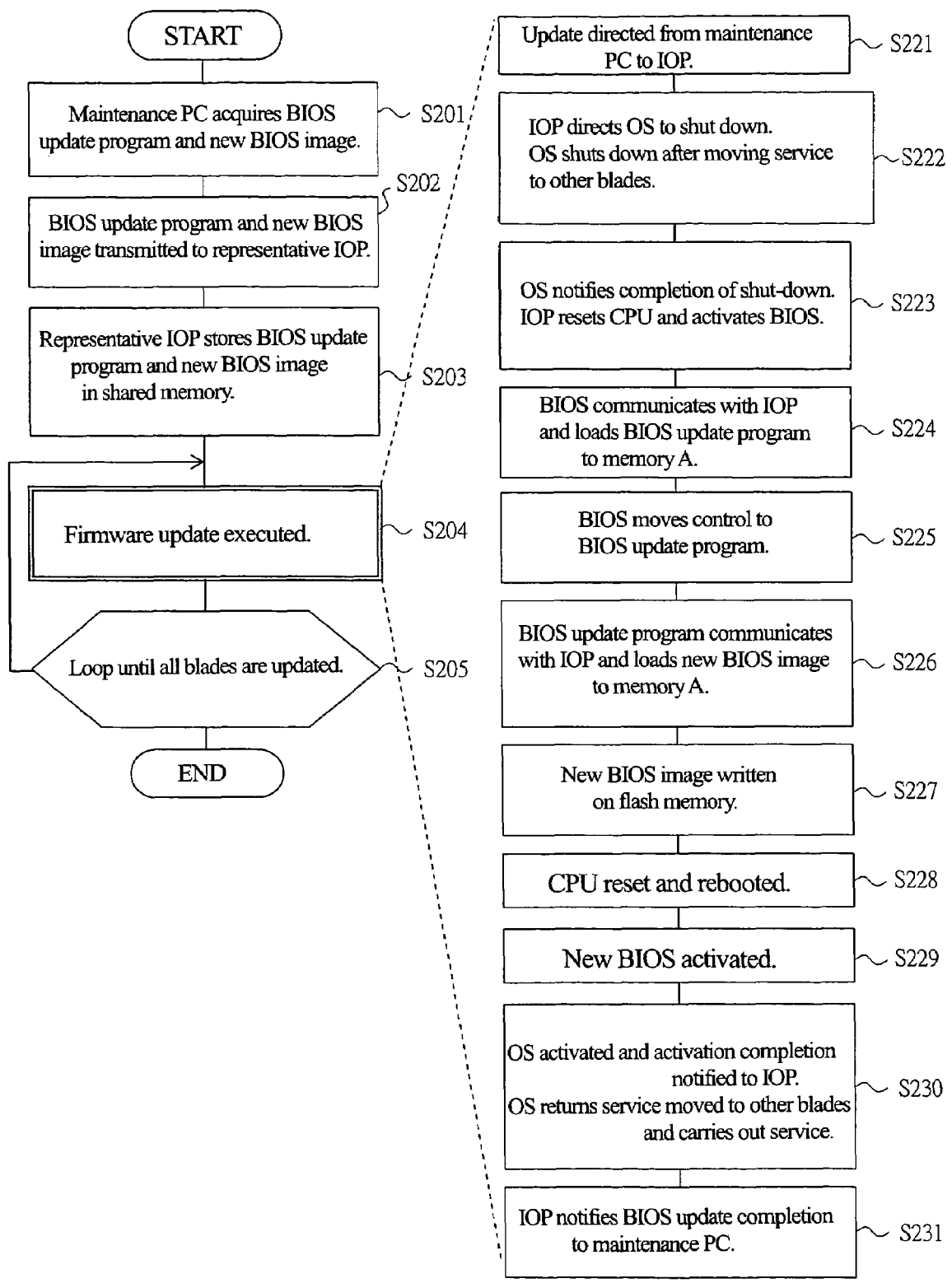
FIG. 10 is a flow chart indicating the processing procedure corresponding to the second processing method of the first firmware update method in the storage system in embodiment 1 according to the present invention.

FIG. 10 is a flow chart that shows the processing procedure that complies with the second processing method in the first firmware update methods in the storage system in embodiment 1. By the second processing method, with communication with PC 200 being continued for services, the blade 10 updates the firmware by automatically carrying out fail-over without manual intervention of the operator (the maintenance personnel or user-side administer). By the second processing method, with OS 21 of the blade 10 set as a starting point, handover of the service is carried out. As an example, firmware update processing is implemented in order of blades #1 and #2.

Processing of S201 through S203 is same as S101 through S103 in the first processing method. By these processes, the BIOS update program 22 and new BIOS image 23 are stored on the shared memory 120 and conditions are al set for starting firmware update processing in each blade 10. Thereafter, through communication between the maintenance PC 160 and IOP 12 of each blade 10, firmware update processing automatically takes place.

In S204 and S205, firmware update processing of the firmware update processing execution candidate blade 10 is performed without intervention of operation of fail-over or fail-back in the first processing method, and the processes are repeated until firmware update processing of all the candidate blades 10 is completed.

In S204 processing, first of all, the BIOS update direction is transmitted from the maintenance PC 160 to IOP 12 of firmware update processing execution candidate blades (for example, blade #1) 10 through the second network 42 (S221). IOP 12 of blade 10 directs OS 21 being operating on CPU 11 to shut down when the BIOS update direction is received from the maintenance PC 160. OS 21 which received this shutdown direction performs service move processing for handing over the service to other blades 10 (for example, blade #2) which are not subject to the start of update processing execution and then, shuts down OS 21 (S222).

Thereafter, in S223 through S229, same as the first processing method, BIOS update processing is performed. By this the new BIOS is booted.

At S230, OS 21 is booted, and after the completion of booting, OS 21 gives a booting completion notice to IOP 12. In addition, this OS 21 carries out fail-back processing for returning the service handed over to other blades 10 (for example, blade #2) before firmware update processing to its own OS 21, and the relevant service to PC 200 is continued to be furnished. Thereafter, the completion of BIOS update is notified from IOP 12 to maintenance PC 160 (S231).

As described in the above processing procedures, OS 21 of the blade which is directed to update carries out fail-over with other blades 10 to hand over the services to other OS 21, and then, firmware update of its own blade 10 is performed. The details of the fail-over processing are same as those of the first processing method.

The critical difference between the first processing method and the second processing method lies in whether fail-over for updating the firmware is manually performed by intervention of operators or performed automatically. During fail-over, that is, in service move processing between blades 10, between the time from stopping of the service in one blade 10 to beginning of providing the service in the other blade, there exists a period in which access from client PC 200 to be client is denied. By the first processing method, the period of this fail-over can be expressly recognized and grasped by the maintenance personnel and user-side administrator. By this, the method has an advantage that, for example, the maintenance personnel and user-side administrator grasp the period and notify it to the user side or system operating side in advance. On the other hand, by the second processing method, the period of this fail-over cannot be expressly recognized or grasped, but the method has an advantage that troublesomeness of operation can be completely eliminated because there is no need of operator's intervention.

In addition, in the second processing method, in firmware update processing of S204, firmware of a plurality of blades 10 may be simultaneously updated.

<First Firmware Updating Method—Third Processing Method>

Figure 11:
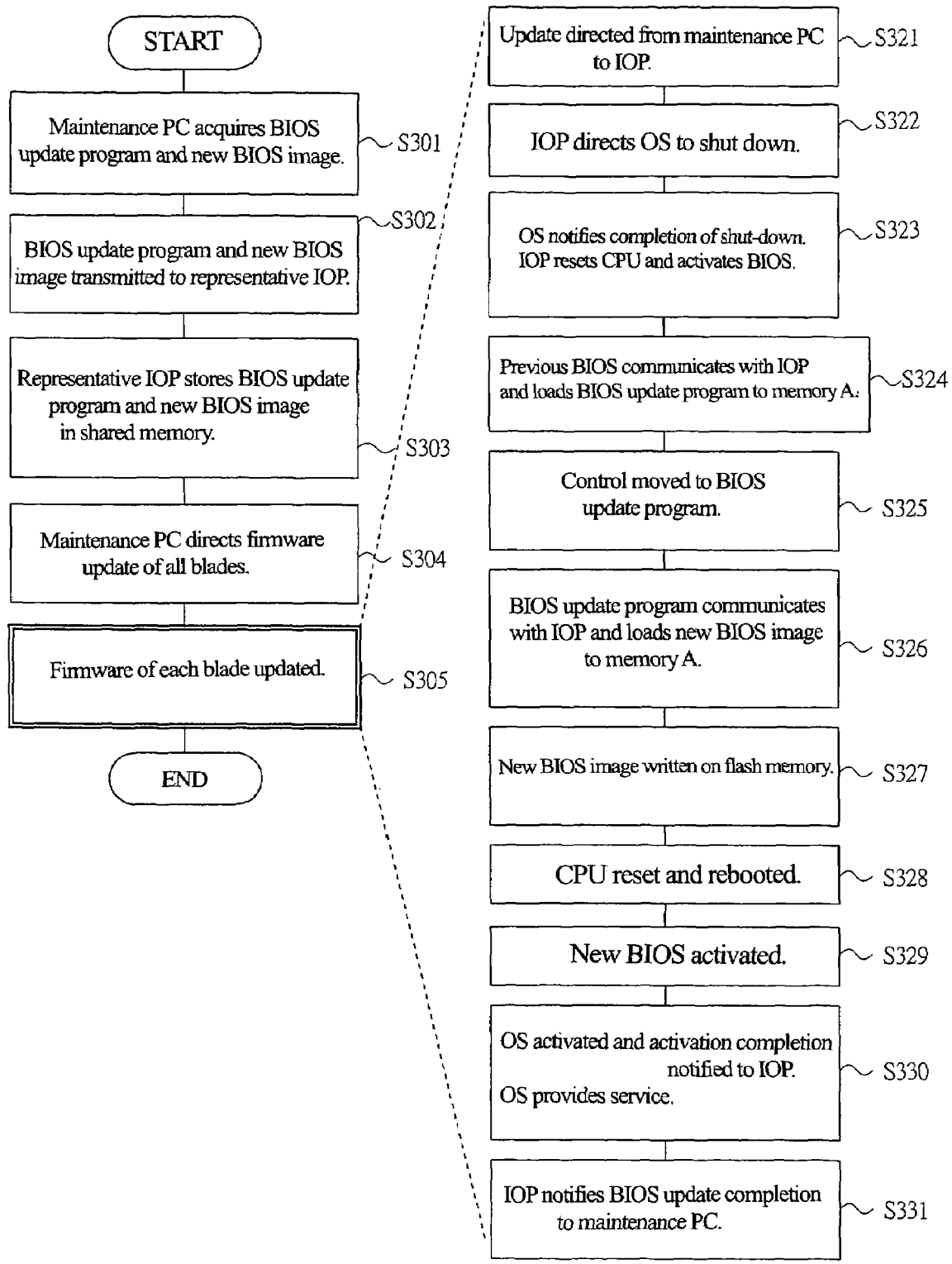
FIG. 11 is a flow chart indicating the processing procedure corresponding to the third processing method of the first firmware update method in the storage system in embodiment 1 according to the present invention.

FIG. 11 is a flow chart indicating the processing procedure corresponding to the third processing method of the first firmware updating methods in the storage system in embodiment 1. In the third processing method, firmware is updated with the communication for service between the blade 10 and client PC 200 being interrupted (off-line state). In a plurality of firmware update candidate blades 10, firmware update processing is carried out all at once, and no service is moved between blades 10 due to fail-over. In the case of this third processing method, it is unable to continue to provide service to client PC 200 in the blade 10 for which the firmware is updated, but as discussed later, attractive effects can be achieved by combining the third method with other processing methods (above-mentioned first and second processing methods).

Processing of S301 through S303 is same as that of S101 through S103 of the first processing method. In S304, maintenance PC 160 returns BIOS update directions to all the firmware update processing execution start candidate blades 10 (for example, blades #1 and #2) through the second network 42. Based on the directions, in S305, firmware update processing of each blade is started simultaneously.

Processing from S321 to S329 is same as that from S121 to S130 of the first processing method. In S330, in each blade 10 for which BIOS has been updated, OS 21 is booted and after the completion of booting, OS 21 gives the start completion notice to IOP 12. And OS 21 after start provides the service in charge to PC 200. IOP 12 which received the start completion notice from OS 21 notifies BIOS update completion to the maintenance PC 160 through the second network 42 (S331).

The important difference between the first and the second processing methods and the third processing method lies in whether firmware update is implemented during access from client PC 200 or whether access from PC 200 is stopped and firmware update is performed off-line. In the third processing method, since service is interrupted or is not furnished, the method has advantages of being free of move of service between blades 10 and of minimizing the time required for updating the firmware of a plurality of blades 10 by simultaneously updating the firmware of each one of a plurality of update candidate blades 10. For example, if there is any blade 10 which need not furnish service to client PC 200 or which has no problem in temporarily interrupting the service being furnished, the third processing method should be chosen and updating should be performed.

It is possible to perform firmware update by combining the first to third processing methods in the first firmware updating method described above in cluster units in the cluster configuration. For example, in the event that PC 200 which is connected to cluster #1 cannot cut the access of service, for blade 10 in cluster #1, the firmware is updated by the first or the second processing method and when PC 200 connected to cluster #2 can cut the access of service, the firmware is updated by the third processing method for the blade 10 in cluster #2.

In addition, in the first to third processing methods, in a group of blades 10 that compose one cluster unit, the number and selection of blades 10 to be subject to simultaneous firmware update processing are optional. In addition, the execution order of firmware update processing is also optional. For example, it is possible to perform firmware update processing successively for every one of the blades 10 in the cluster (Example A). For example, of eight blades 10, one blade is chosen each time and firmware is updated one by one successively. In such event, long total time is required to update firmware of a plurality of blades. That is, it takes time of "firmware update processing time for one blade×number of update candidate blades." In turn, failure of new BIOS image 23 or the range of influence of trouble such as power supply trouble (the whole system goes down), etc. during update processing can be suppressed to one blade. In addition, for example, firmware update processing can be preformed on every ½ (one half) blades 10 in the cluster (Example B). For example, of the eight blades, four blades each are updated successively. In such event, the minimum total time is required for updating the firmware. That is, it generally takes the time of "firmware update time of one blade×2." In turn, once defective new BIOS image 23 is written to flash memory 15, OS 21 of one half of the blades 10 of the cluster cannot be booted, creating a risk of update processing by just that much. Furthermore, for example, it is possible to perform firmware update processing for every ¼ of blades 10 in the cluster. For example, firmware is updated for every two blades of the eight blades. In such event, the total time required for firmware updating is intermediate between with respect to the total time required for the two cases (Examples A and B). That is, it generally takes time of "firmware update time of one blade× 4." In addition, the risk of updating processing becomes also intermediate. The firmware of blades 10 can be flexibly updated by appropriately choosing and combining the processing methods with their efficiency and risk taken into account in accordance with the condition of the storage system and the computer system.

<OS Condition Information>

Figure 12:
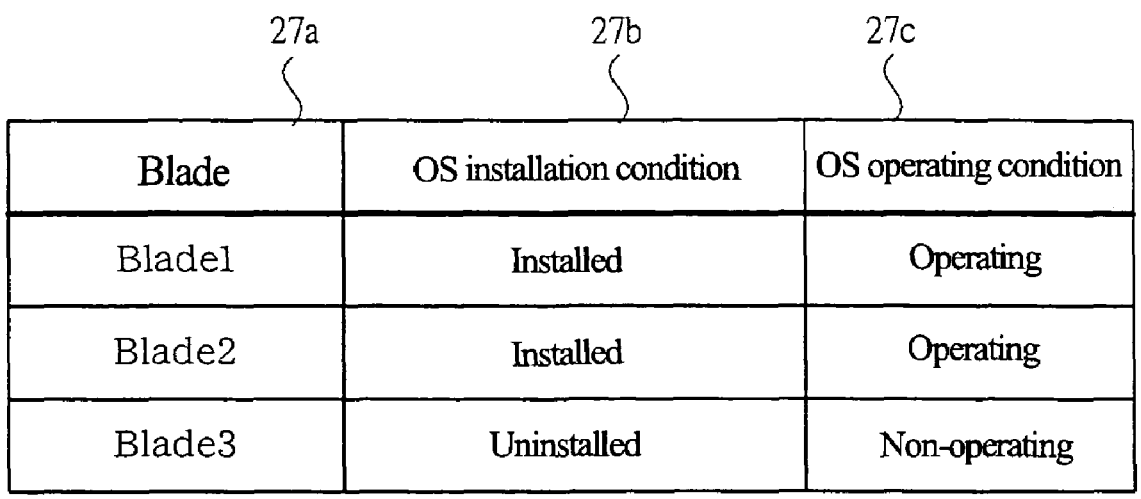
FIG. 12 is a table indicating the control information for grasping the blade OS condition in the storage system in embodiment 1 according to the present invention.

FIG. 12 shows a table that holds OS condition information 27. The control unit 100 of the storage system holds the OS condition information 27 which is the control information for grasping the condition of OS 21 of each blade 10 in any of the memory. For example, the OS condition information 27 is held in the shared memory 120. The OS condition information 27 is used for service move particularly between blades 10 and used to judge when OS 21 is shut down, when firmware update is performed by the first firmware updating method, etc. IOP 12 of each blade 10 grasps the installation or operating condition of OS 21 in its own blade 10 on the basis of direct communication with CPU 11, and stores the information in the shared memory 120 as OS condition information 27. IOP 12 can recognize the condition of OS 21 in each blade 10 including other blades 10 by referring to the OS condition information 27 stored in the shared memory 120.

The OS condition information 27 has blade 27*a* which is the blade identification information, OS installation condition 27*b*, and OS operating condition 27*c* as data items. OS installation condition 27*b* indicates the condition such as "installed," "uninstalled", and the like. OS operating condition 27*c* indicates the condition such as "operating," "non-operating," "service stopped", etc. The "operating" condition indicates that OS 21 of the relevant blade 10 is booted and is providing service to PC 200. The "non-operating" condition indicates that OS 21 of the relevant blade 10 is shut down. The "service stopped" condition indicates the condition in which OS 21 of the relevant blade 10 is booted but does not provide service to PC 200. The "service stopped" condition includes the condition in which the service is taken over by other blades 10 due to fail-over.

In the first firmware update method, whether or not OS 21 must be shut down during firmware update processing depends on the OS 21 condition. Consequently, IOP 12 refers to the OS condition information 27 on shared memory 120 and decides the need or no-need of shutdown of OS 21. For example, in S123, if the OS operating condition 27*c* of the relevant OS 21 is in the "non-operating" condition, OS 21 has already been shut down on the basis of the OS condition information, and therefore, no shutdown is directed to the relevant OS 21 and the procedure moves to the following step (reset of CPU 11). In addition, IOP 12 refers to and checks the OS condition information 27 to determine whether or not OS 21 of other blades 10 in the cluster is operated prior to shutting down OS 21. If the operating condition of OS 21 of other blades 10 in the cluster is not "operating," the move to hand over the service provided by its own OS 21 cannot be effected. Therefore, no shutdown direction is given to OS 21 operating on CPU 11 and processing is stopped.

Maintenance PC 160 and control PC 200 can display the information of tables shown in FIGS. 7, 8, 12, and others and information and others concerning the cluster configuration shown in FIG. 6 on the output unit screen. The maintenance personnel and user-side administrator refer to the information displayed on the screen and enter the directions for updating the firmware.

<BIOS Image>

Figure 13:
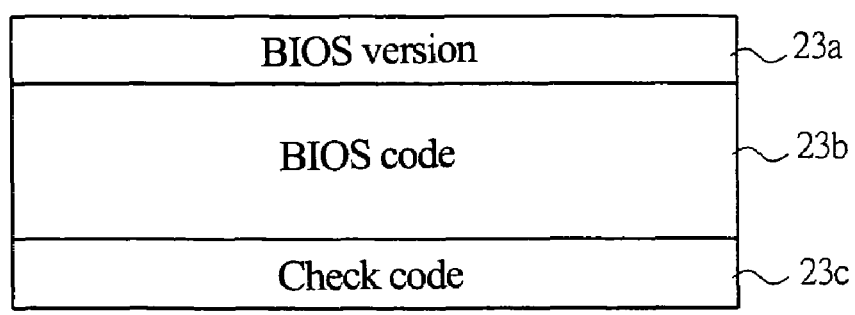
FIG. 13 is an illustration indicating the data configuration of a new BIOS image used for updating the firmware in the storage system in embodiment 1 according to the present invention.

FIG. 13 is an illustration indicating the data configuration of the new BIOS image 23 used for firmware updating. The new BIOS image 23 comprises BIOS version 23*a*, BIOS code 23*b*, and check code 23*c*. The BIOS version 23*a* is the information expressing the version of BIOS code 23*b*. The BIOS version 23*a* is referred to at the time of version judgment processing in which whether or not the candidate firmware should be updated is decided. The BIOS code 23b is a code that forms the BIOS proper. The BIOS code 23b includes the code for startup processing of OS 21. The check code 23c is the code for processing checks generated from BIOS code 23b. Check processing is carried out to check whether or not the BIOS code 23b that is new BIOS is normal, that is, whether or not the new BIOS image 23 is properly transferred to and from sections and whether it is broken or not, and it is carried out at each section which transfers the new BIOS image 23. Check processing is carried out by, for example, maintenance PC 160 and IOP 12 in blade 10 or CPU 11, etc.

During firmware update processing, check processing is carried out on the BIOS code 23b using the check code 23c at each section in the timing associated with the transfer of new BIOS image 23 between sections, etc. If the result of checking the BIOS code 23b using the check code 23c becomes error, the BIOS code 23b, that is, the new BIOS is defective, and the maintenance PC 160 and storage system interrupt the firmware update processing. Examples of the timing for carrying out the check processing include the following: when the maintenance PC 160 acquires the new BIOS image 23 from FD 31 or maintenance center 32 on memory, the maintenance PC 160 carries out the check; when the new BIOS image 23 is transferred onto memory B14 from maintenance PC 160 to IOP 12 of blade 10, IOP 12 carries out the check; or right before the new BIOS image 23 is written on flash memory 15 from memory A13 of blade 10, the BIOS update program 22 on CPU 11 carries out the check. The check processing may be carried out at all the sections or once only at any of the sections, for example, right before the new BIOS image is written on flash memory 15, or others.

As described above, in the storage system according to embodiment 1 firmware update processing is successively performed by the first firmware updating method for each firmware update candidate blade 10, while fail-over (service move processing) for updating firmware is being carried out in unit of blades 10 based on the cluster configuration. By this, firmware update can be completed with service to client PC 200 being continued to be provided. In particular, in the case of embodiment 1, since the BIOS update program 22 and the new BIOS image 23 are stored in the shared memory 120, it is possible to update the firmware to the latest BIOS even when blade 10 is expanded or replaced in the storage system as later discussed. In addition, even when OS 21 is unable to be booted, for example, in the case of OS 21 failure or before OS 21 is installed, firmware can be updated.

Embodiment 2

Figure 14:
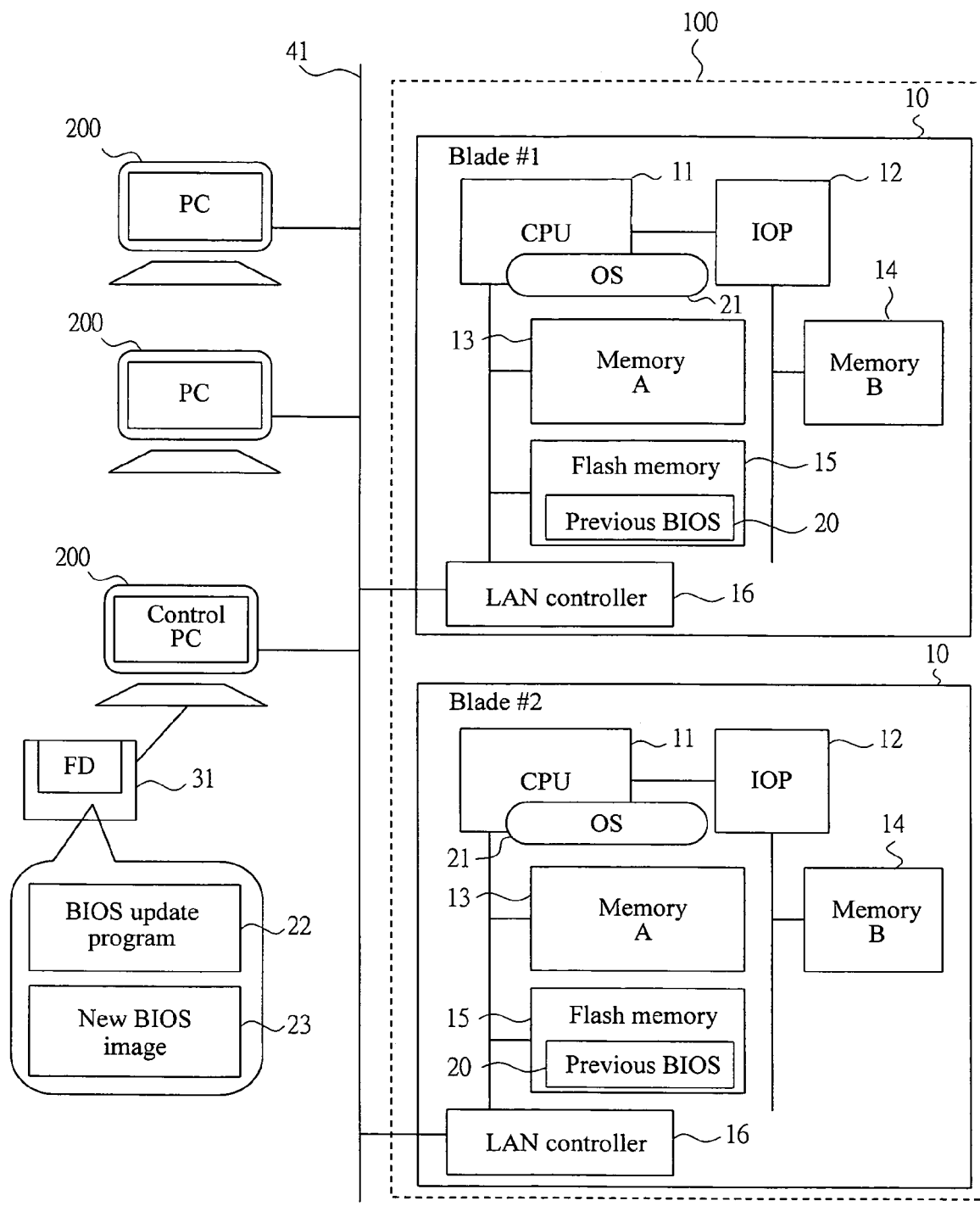
FIG. 14 is a diagram illustrating a functional block configuration of the whole computer system including a storage system related to embodiment 2 of the present invention.

Next discussion will be made as follows on the storage system in embodiment 2 according to the present invention. FIG. 14 indicates a functional block configuration of the whole computer system including the storage system in embodiment 2 according to the present invention. In particular, the present figure illustrates primarily the sections involved in updating the firmware held by circuit boards which compose the control unit 100. The hardware configuration of the storage system according to embodiment 2 is same as that of embodiment 1, but processing implemented from software differs. In embodiment 2, same as embodiment 1, clusters are formed and control information and OS condition information 27 for services are stored and controlled in memory.

In the firmware updating method in the storage system of embodiment 2 (hereinafter called the second firmware updating method), firmware is updated with special emphasis on the control by OS 21 operating on CPU 11 of blade 10. Clusters are formed with the circuit board targeted for the update of the firmware included. The control PC 200 used by the user-side administer can gain access to all the firmware upgrade candidate blades 10 and can communicate with OS 21 that operates on CPU 11 of blade 10. Directions for service move (fail-over) to OS 21 for firmware updating are executed by the user-side administrator and others to enter directions from control PC 200. In embodiment 2, there is no need to use the maintenance PC 160 for firmware updating.

In FIG. 14, blade #1 and blade #2 (10) which are blades comprising the control unit 100 correspond to the channel control section 110, respectively. In the present figure, for cluster configuration, two blades 10 only are shown, but clusters can be formed by a plurality of blades 10. The hardware configuration of blade 10 is same as that in the case of embodiment 1. In embodiment 2, the second network 42 and LAN controller 17 need not be used.

The control PC 200 has the control functions for executing fail-over, etc. available on the special-purpose software, and can execute fail-over directions and others against blades 10 on the basis of directions entered by the user-side administrator. The control PC 200 carries out processing for reading the data from FD 31. FD 31 stores the BIOS update program 22 and the new BIOS image 23 in memory. In addition, the control PC 160 may download and acquire the BIOS update program 22 and the new BIOS image 23 from the maintenance center 32 through communication lines. The first network 41 is the network primarily for providing services to PC 200, and corresponds to the LAN 400, SAN 500, and the like. Communications are possible between PC 200 including the control PC 200 and firmware update candidate blade 10 through the first network 41.

In embodiment 2, in CPU of control PC 200 and CPU 11 of blade 10, programs for achieving various kinds of processing related to firmware updating later discussed are run.

<Second Firmware Updating Method>

Referring now to FIG. 14, the second firmware updating method will be described. As an example of the blade 10 which is subject to firmware update processing, blade #1 and blade #2 of a plurality of blades connected to the control unit 100 are discussed.

Figure 15:
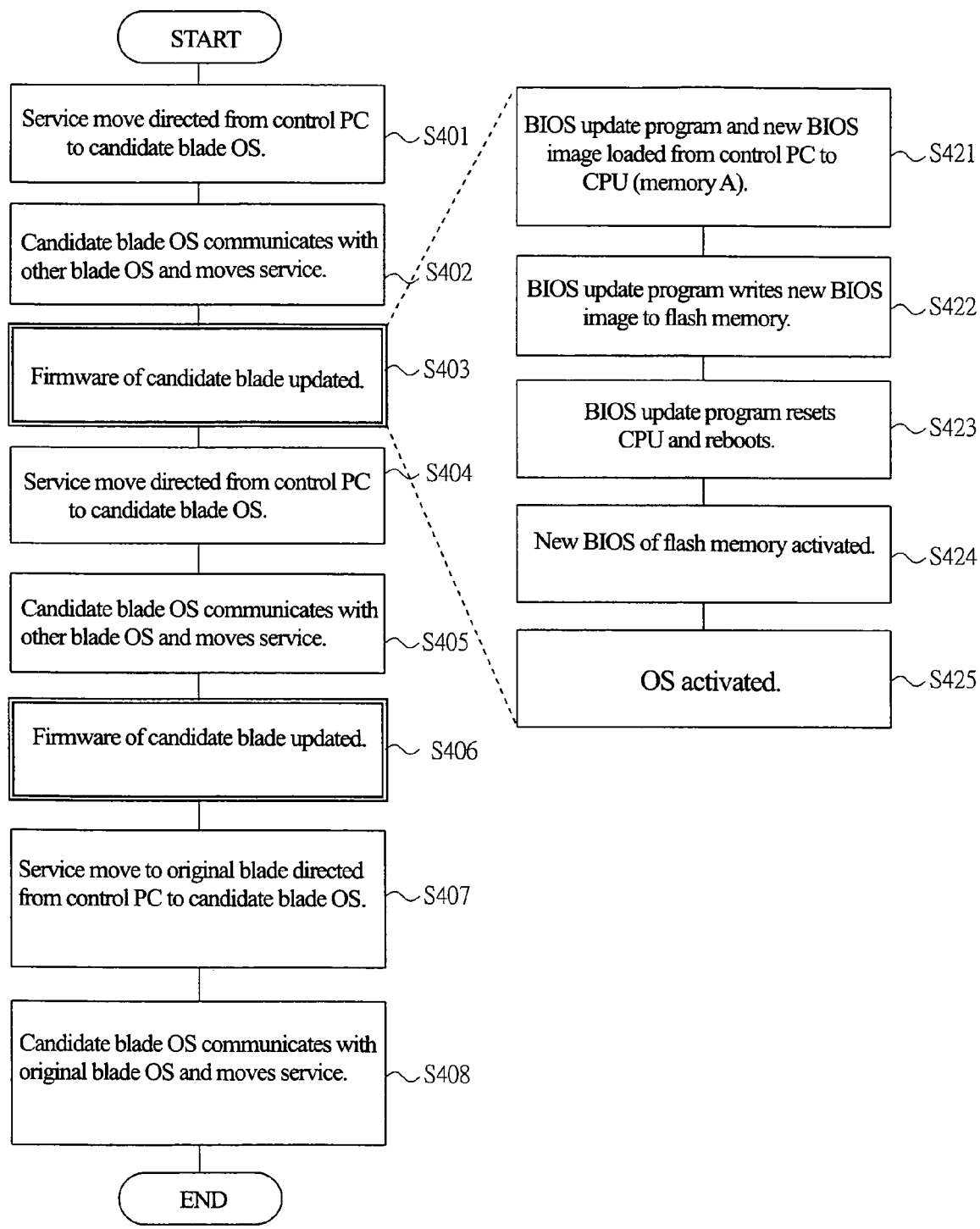
FIG. 15 is a flow chart indicating the processing procedure corresponding to the processing method of the second firmware update method in the storage system in embodiment 2 according to the present invention.

FIG. 15 is a flow chart indicating the processing procedure that corresponds to the second firmware updating method in the storage system according to embodiment 2. In the second firmware updating method, fail-over is implemented by manual or automatic operation with the intervention of operator (user-side administrator, etc.) allowed and firmware of each blade 10 is updated with communications for service to client PC 200 being continued. In addition, fail-over for the firmware updating is carried out via the first network 41 with the directions from the control PC 200 used as a starting point. Now, for an example, firmware update processing is implemented in order of blade #1 and blade #2.

First of all, based on the operation of the user-side administrator, service move directions to move the service being furnished to other blade (for example, blade #2) 10 which is not subject to the start of firmware update processing execution are transmitted from control PC 200 to OS 21 of the blade (for example blade #1) 10 which is subject to the start of firmware update processing execution among the firmware update candidate blades 10 (S401).

The OS 21 of the blade (blade #1) 10 which has received the service move direction for the firmware update processing from the control PC 200 communicates with the OS 21 of other blade (for example, blade #2), and carries out the processing to hand over the service being furnished by its own OS 21 to other OS 21 (S402). As a result of the service move, the control information of the system device is changed.

After the service is moved, the implementation of firmware update processing is started for the blade (blade #1) 10, which is subject to the start of firmware update processing execution (S403).

In S403, first of all, the BIOS update program 22 and the new BIOS image 23 are transmitted from the control PC 200 to the CPU 11 and the memory A13 of the candidate blade 10 via the first network 41 and loaded into the memory A13 (S421).

Then, the BIOS update program 22 on the memory A13 is executed by the CPU 11 of candidate blade 10, and the BIOS update program 22 writes the new BIOS image 23 loaded on the memory A13 on the previous BIOS 20 of the flash memory 15 (S422). And the BIOS update program 22 resets the CPU 11 from hardware and reboots the system of the relevant blade 10 (S423).

By rebooting the system, the new BIOS on the flash memory 15 of the blade 10 is started (S424). By the processing by the started new BIOS, the OS 21 is booted and BIOS update is brought into the effective state (S425). This concludes firmware upgrading processing in the candidate blade 10.

By the processing of S403, after the completion of firmware update processing of the candidate blade (blade #1) 10 among the firmware update candidate blades 10, in and after S404, service move processing to return the service to the blade (blade #1) 10 completed with firmware update processing, or service move processing for firmware update processing of the blade (blade #2) 10 which is subject to next firmware update processing execution start is executed. In the example of processing procedure shown in FIG. 15, these service move processes are carried out en bloc.

In S404, based on the operation of the user-side administrator, service move directions for moving the service being furnished to the blade (for example blade #1) 10 which is not subject to next firmware update processing execution start is transmitted from control PC 200 to OS 21 of the blade (blade #2) 10 which is subject to next firmware update processing execution start (S404). In the present example, for the order of firmware update, the blade #2 which takes on the service of blade #1 is chosen as the update candidate next to the update of blade #1.

The OS 21 of the blade (blade #2) which received the service move directions for the firmware update processing from the control PC 200 communicates with OS 21 of other blade (blade #1) and carries out the processing for hand over the service being furnished by its own OS 21 to other OS 21 (S405). As the service is moved, the control information of the system device is also changed. In the present example, as the service move, the service which is originally furnished to blade #1 by the blade #2 and the service taken on from the blade #1 (that is, fail-back) are moved.

After the services are moved, execution of firmware update processing is started for the blade (blade #2) 10 subject to the firmware update processing execution start (S406). The relevant processing is same as that in S403. By this, BIOS on flash memory 15 of the candidate blade (blade #2) 10 is updated and BIOS update is brought to the effective state.

By the processing of S406, after the completion of firmware update processing of the candidate blade (blade #2) 10, in and after S407, service move processing to return the service to the blade (blade #2) 10 completed with firmware update processing, or service move processing for firmware update processing of the blade 10 which is subject to next firmware update processing execution start is executed. In the present example, by carrying out service move to return service which blade #2 is originally furnished from blade #1 to blade #2, firmware updating is completed.

That is, based on the operation of the user-side administrator, service move directions to return the service to original blade (blade #2) 10 are transmitted from the control PC 200 to OS 21 of the blade (blade #1) which is taken over the service of the blade (blade #2) completed with the firmware update processing (S407).

And OS 21 of the blade (blade #1) 10 which received the service move directions from control PC 200 communicates with OS 21 of other blade (blade #2) 10 and carries out the processing to return to the original blade 10 the service originally furnished by other blade (blade #2) of the services which its own OS 21 is being furnished (S408). As a result of service move, the control information of the system device is also changed. When there is no blade which is subject to next firmware update processing execution start, firmware update processing is ended.

In embodiment 2, same as in embodiment 1, it is possible to execute firmware updating by combining processing methods corresponding to the first through third processing methods in the first firmware updating method in cluster units in the cluster configuration. That is, issuance of the fail-over directions for firmware updating from control PC 200 to the blade 10 may be carried out to each blade by manual operation through the intervention of the operator or may be automatically processed sequentially from software. In addition, a process to interrupt the service for blade 10 and carry out firmware update may be combined. In addition, same as embodiment 1, in the group of blades 10 that form one cluster unit, firmware update processing may be simultaneously carried out by a plurality of blades 10. The number and selection of the blades 10 which are simultaneously subject to firmware update processing are optional. In addition, the sequence of executing firmware updating processing is also optional.

As described above, in the storage system according to embodiment 2, by the second firmware updating method, firmware update processing of each firmware update candidate blade 10 is successively implemented while fail-over for firmware updating is being carried out in units of blade 10 by the cluster configuration. By this, it is possible to complete updating the firmware with the service furnished to client PC 200 being continued. In particular, in the case of embodiment 2, loading (file transfer) for firmware updating of blade 10 and upgrade processing are possible from general computer equipment such as PC 200, etc. In addition, because the BIOS upgrade program 22 functions as an application that operates on versatile OS 21, it is possible to operate the BIOS update program in combination with the OS 21 functions. By this, for example, using the scheduling function which OS 21 possesses, it is possible to carry out unmanned updating of BIOS of blade 10 in the night time.

<Firmware Updating when Blades are Expanded>

Figure 16:
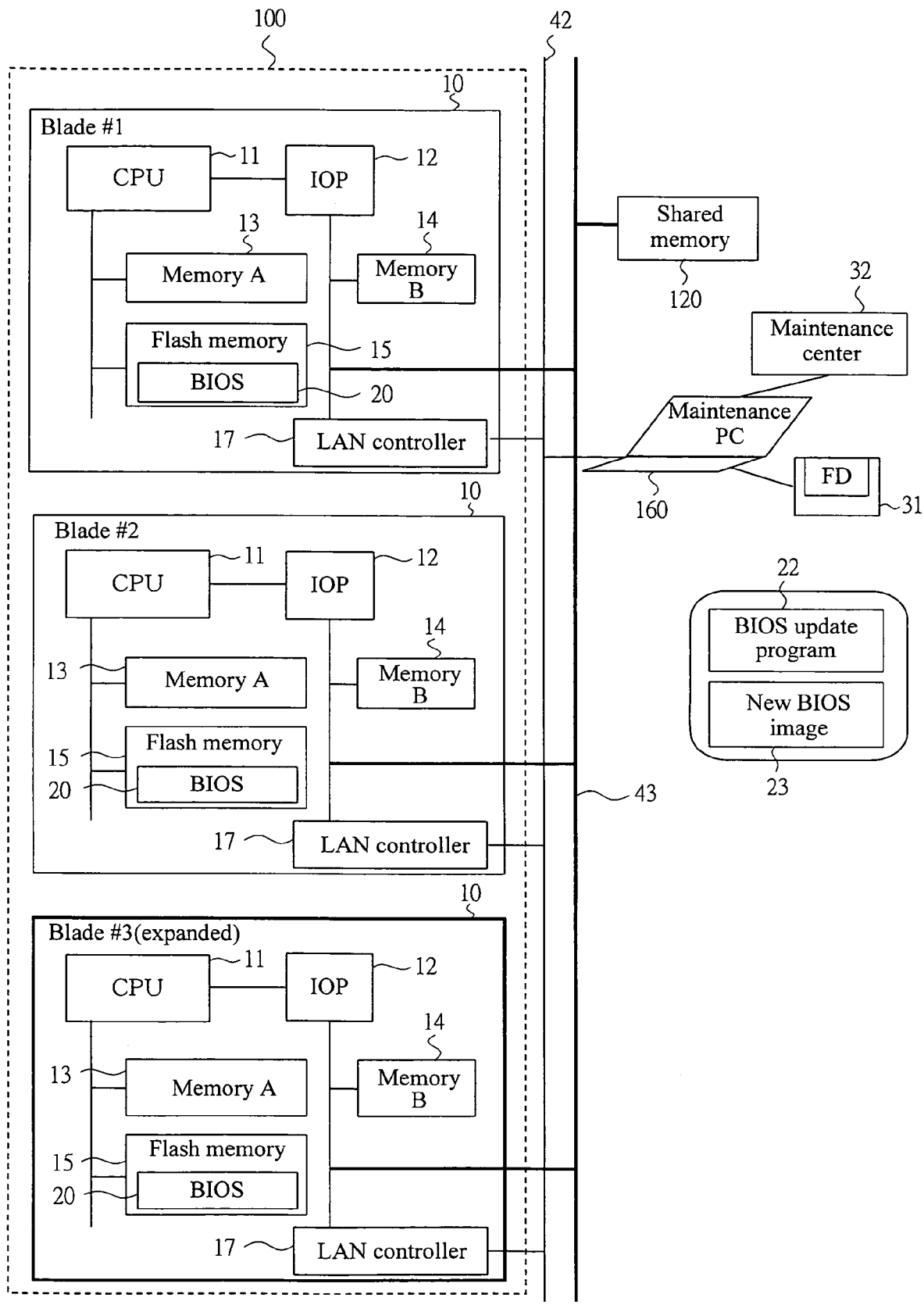
FIG. 16 is an illustration describing the configuration related to firmware update processing when blade substrates are expanded in the storage system in embodiment 1 according to the present invention.

Next discussion will be made on the processing when firmware updating is carried out at the time of blade extension using the first firmware updating method. FIG. 16 is an illustration describing the configuration related to firmware update processing when blade substrates are expanded in the storage system in embodiment 1. The BIOS update program 22 and the new BIOS image 23 exist in at least any of the places of maintenance PC 160, blade 10, shared memory 120, and the like.

When the blade 10 is expanded in the control unit 100 of the storage system, to the expanded blade 10, OS 21 has not yet been installed. Consequently, in such event, the second firmware updating method cannot be applied but based on the first firmware updating method, firmware including the previous BIOS 20 is updated with primary emphasis placed on the control by IOP 11 of the blade 10. As an example, the description will be made on a case in which the blade #3 is further expanded for the storage system to which blades #1 and #2 have already been mounted.

When the blade extension is carried out, there are following first through third processing methods in accordance with the difference of conditions at the time of blade extension. In accordance with the difference of each condition, firmware update processing is carried out. The difference of conditions at the time of blade extension is automatically decided by the processing by each section inside the storage system, IOP 12 or maintenance PC 160, and the like. For example, it is possible to judge whether or not the new BIOS image 23 is present by IOP 12 or maintenance PC 120 which refers to shared memory 120.

Figure 17:
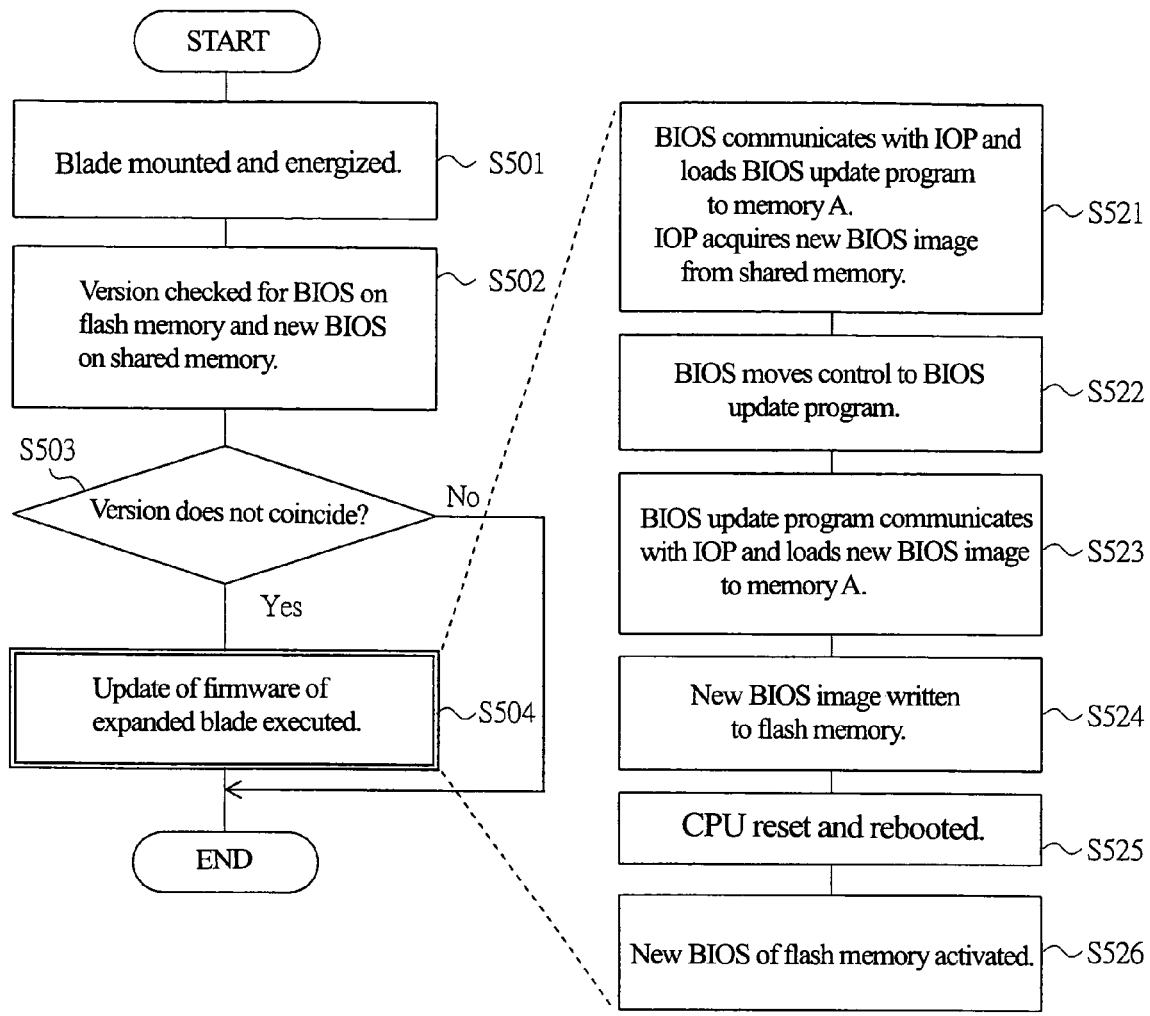
FIG. 17 is a flow chart illustrating the processing procedure corresponding to the first processing method when blade substrates are expanded in the storage system in embodiment 1 according to the present invention.

First of all, the first processing method at the time of blade extension is the processing when the new BIOS image 23 is stored in shared memory 120 as the condition at the time of blade extension. FIG. 17 is a flow chart illustrating the processing procedure corresponding to the first processing method at the time of blade extension. The case in which the new BIOS image 23 is stored in shared memory 120 is when the representative IOP 12 in, for example, the first firmware update processing method stores the BIOS update program 22 and the new BOIS image 23 from memory B14 to shared memory 120.

First of all, by the operation of the maintenance personnel, etc., a new blade #3 (10) subject to extension is mounted to a slot of the storage system and energized (S501). The blade #3 (10) after energization carries out version judgment processing for checking the difference of the version between BIOS (previous BIOS) 20 stored in its own flash memory 15 and BIOS (new BIOS image 23) stored in the shared memory 120 (S502). In this version judgment processing, need or no-need of BIOS update is decided by referring to the information, etc. of BIOS version 23a contained in the new BIOS image 23 and comparing the size of the version in each BIOS.

If the versions coincide as a result of version judgment (S503—No), it is decided that there is no need of updating BIOS 20, and the process is finished without updating BIOS 20 of the expanded blade #3 (10). If the versions do not coincide as a result of version judgment (S503-Yes), that is, it is decided necessary to upgrade BIOS 20 of the expanded blade #3 (10) to BIOS included in the new BIOS image 23, firmware update processing is carried out on BIOS 20 of the expanded blade #3 (10) (S504).

In processing of S504, first of all, BIOS (previous BIOS) 20 of the expanded blade #3 (10) communicates with IOP 12 in the same blade and loads the BIOS update program 22 from the shared memory 120 to memory A13 through the processing by IOP 12. In such event, the said IOP 12 acquires the new BIOS image 23 from shared memory 120 to memory B14 (S521). Then, the previous BIOS 20 of he expanded blade #3 (10) moves the control to the BIOS update program 22 (S522).

Then, the BIOS update program 22 communicates with IOP 12 and loads the new BIOS image 23 from the memory B14 to the memory A13 (S523). And the BIOS update program 22 writes the new BIOS image 23 loaded into memory A13 on the previous BIOS 20 of flash memory 15 (S524). And the BIOS update program 22 resets CPU 11 from hardware and reboots the system of the blade 10 (S525). By the reboot, the new BIOS on the flash memory 15 is started and BIOS update is brought into the effective condition (526).

Figure 18:
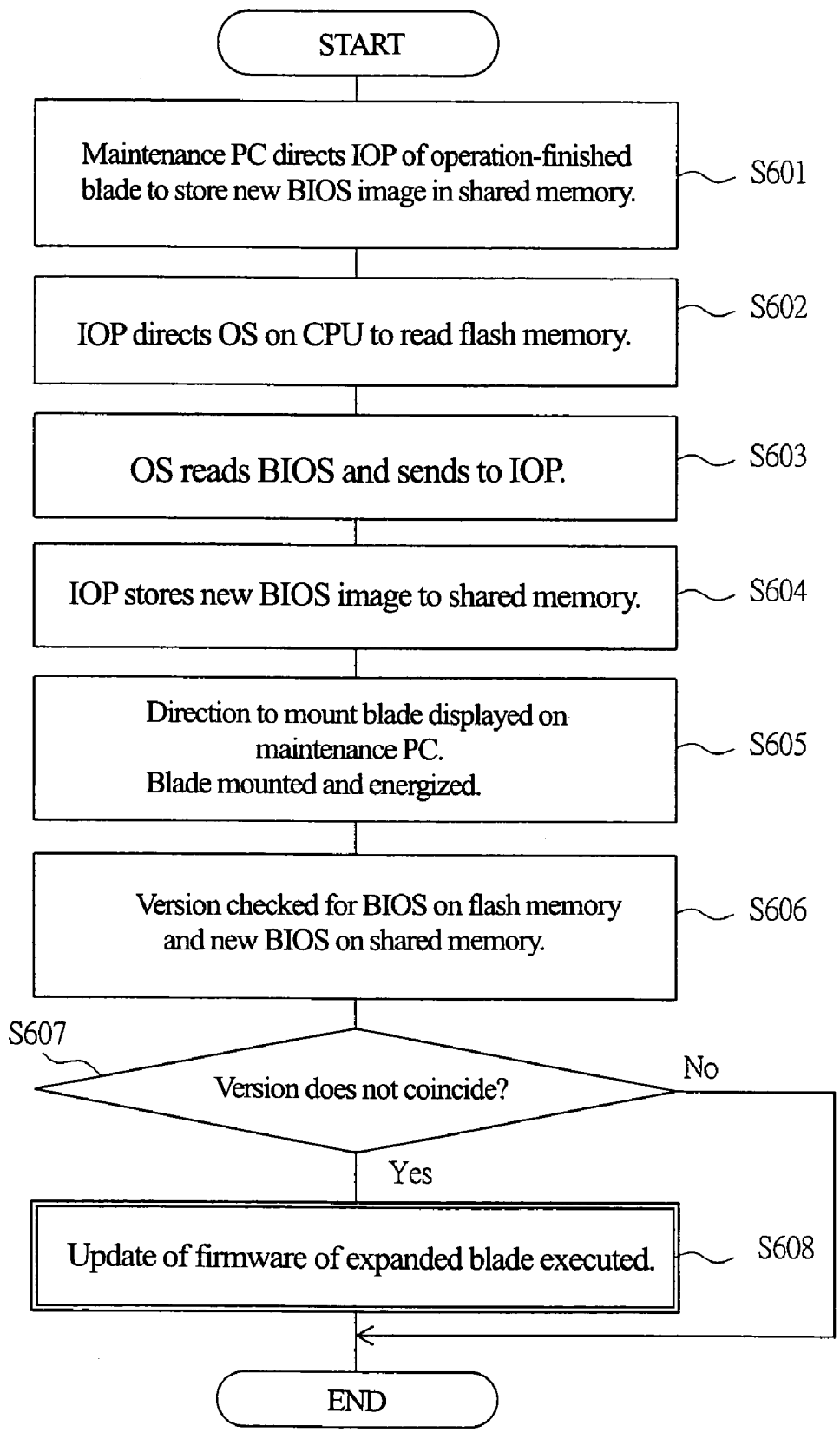
FIG. 18 is a flow chart illustrating the processing procedure corresponding to the second processing method when blade substrates are expanded in the storage system in embodiment 1 according to the present invention.

Then, the second processing method at the time of blade extension is the processing when the new BIOS image 23 is not stored in shared memory 120 and the equipped blade 10 other than the expanded blade 10 has already been activated as the condition when the blade is expanded. FIG. 18 is a flow chart illustrating the processing procedure corresponding to the second processing method at the time of blade extension. In the case of the second processing method, since there is no new BIOS image 23 required for updating on shared memory 120, processing is carried out to store the new BIOS image 23 from the blade 10, which has already possessed the new BIOS image 23 and is in the operating condition, to shared memory 120 and firmware updating is implemented. The BIOS update program 22 and the new BIOS image 23 are handled in a set and stored in shared memory 120. As an example, blades #1 and #2 (10) have already been mounted and operated when the blade #3 (10) is expanded, it is assumed as the condition in which no new BIOS image 23 is stored in shared memory 120.

When it is decided that there is no new BIOS image 23 is present on shared memory 120 through communication between sections, first of all, the maintenance PC 160 gives directions IOP 12 of the blade #1 (10) already being operated to store the new BIOS image 23 into the shared memory 120 via the second network 42 (S601).

IOP 12 of the blade #1 (10) gives OS 21 operating on CPU 11 to read flash memory (S602). Based on this direction, OS 21 on CPU 11 reads BIOS 20 stored on flash memory 15, that is, the new BIOS image 23, and transmits to IOP 12 (S603).

IOP 12 carries out processing for storing the new BIOS image 23 received from OS 21 on CPU 11 in shared memory 120 through the internal bus 43 (S604).

When the new BIOS image 23 is stored in shared memory 120, based on the communication from IOP 12, "blade mounting direction" is displayed on the screen of maintenance PC 160. This direction indicates to the maintenance personnel that the new BIOS image 23 is stored on shared memory 120 and blade 10 is ready to be mounted. The maintenance personnel mount the blade #3 (10) to be expanded to the slot of the storage system on the basis of the direction on the maintenance PC 160. By mounting the blade, the blade #3 (10) is energized (S605).

Thereafter, processing same as the first processing method at the time of blade extension is carried out (S606 through S608). That is, in S606, the energized blade #3 (10) carries out version judgment processing for checking the difference of the versions between BIOS 20 stored on its own flash memory and BIOS (new BIOS image 23) stored on shared memory 120, and based on the judgment result, if the versions do not coincide (S503-Yes), firmware update processing is carried out for BIOS 20 of expanded blade #3 (10) in S608. Processing in S608 is same as that of S521 through S526.

Figure 19:
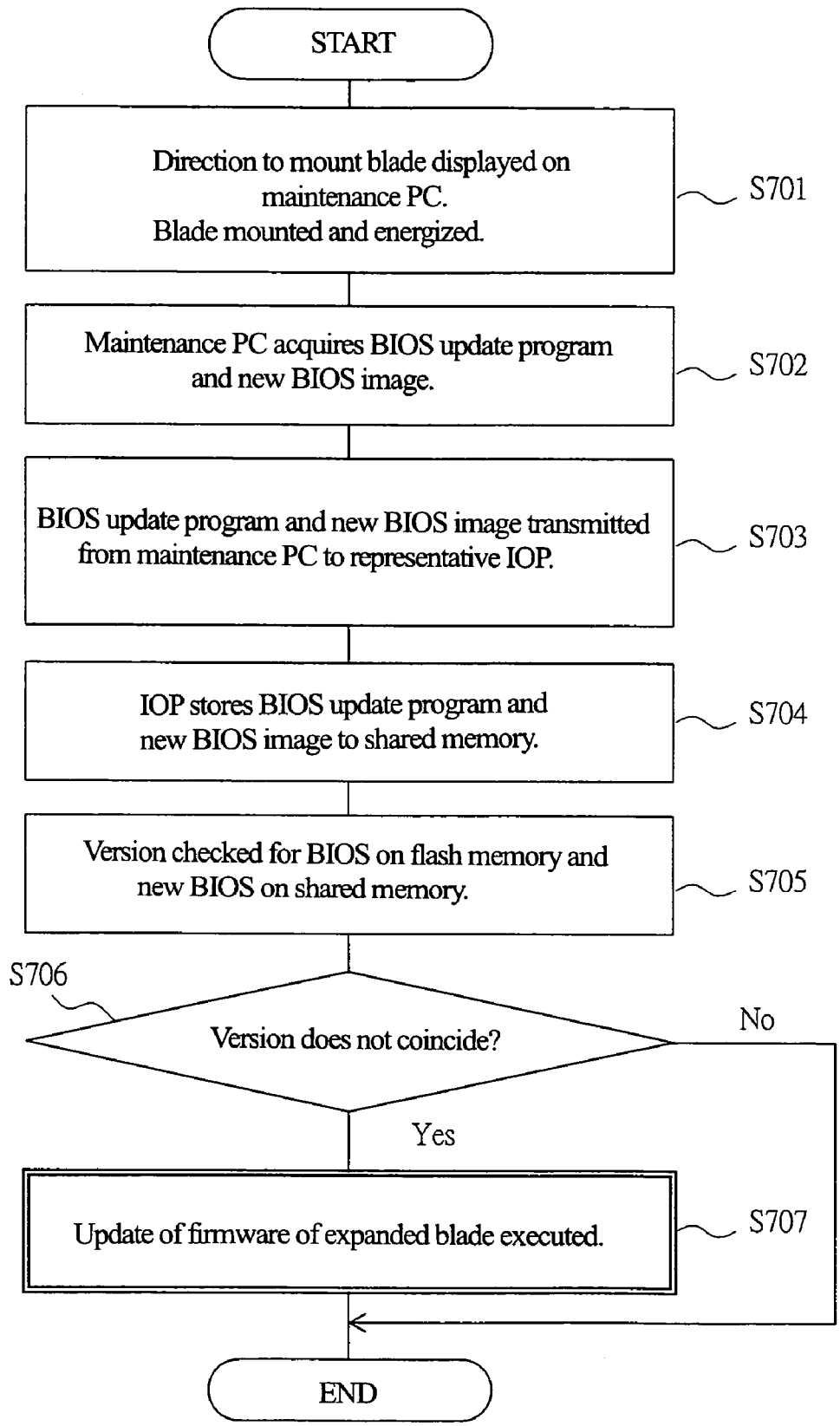
FIG. 19 is a flow chart illustrating the processing procedure corresponding to the third processing method when blade substrates are expanded in the storage system in embodiment 1 according to the present invention.

Next, the third processing method at the time of blade extension is the processing when no new BIOS image 23 is stored on shared memory 120 as the condition at the time of blade extension and the mounted blades 10 other than the expanded blade 10 do not operate. FIG. 19 is a flow chart illustrating the processing procedure corresponding to the third processing method at the time of blade extension. In the case of the third processing method, there is no new BIOS image 23 required for updating on shared memory 120, and the new BOIS image 23 is unable to obtained from other mounted blades 10 because they are not operated. Therefore, processing to acquire the new BOIS image 23 through the maintenance PC 160 is carried out to update the firmware. As an example, it is the condition in which blades #1 and #2 have already been mounted when blade #3 (10) is expanded but they are not operating, and no new BIOS image 23 is stored on shared memory 120.

When it is decided through communication between sections that there is no new BIOS image 23 on shared memory 120 and other blades (#1, #2) 10 other than the expanded blade #3 (10) are in the non-operating condition, first of all, "blade mounting direction" is displayed on the screen of maintenance PC 160. The maintenance personnel mount the blade #3 (10) to be expanded to the slot of the storage system on the basis of the direction, and by mounting the blade, the blade #3 (10) is energized (S701).

Then, the maintenance PC 160 acquires the BIOS update program 22 and the new BIOS image 23 from FD 31 or maintenance center 32 on memory (S702). Then, the maintenance PC 160 transmits the BIOS update program 22 and new BOIS image 23 to IOP 12 of the expanded blade #3 (10) via the second network 42 (S703).

Then, IOP 12 of the expanded blade #3 (10) stores (copies) the BIOS update program 22 and new BOIS image 23 received from maintenance PC 160 on memory B14 (S704). Thereafter, processing same as that of the first processing method at the time of blade extension is carried out (S705-S707). That is, in S705, the expanded blade #3 (10) carries out version judgment processing for checking the difference of the version between BIOS 20 stored on its own flash memory 15 and the new BIOS image 23 received, and if the versions do not coincide as a result of version judgment (S706-Yes), firmware update processing is carried out for BIOS 20 of the expanded blade #3 (10) in S707. Processing of S707 is same as that of S521 through S526.

As described above, updating of firmware of expanded blade 10 can be quickly carried out by each one of the above-mentioned processing methods in accordance with the conditions at the time of blade 10 is expanded.

<Firmware Updating at the Time of Blade Replacement>

Next discussion will be made on the firmware update processing carried out at the time of blade replacement using the first firmware updating method. FIG. 20 is an illustration indicating a configuration related to firmware update processing when the blade is replaced in the storage system of embodiment 1. The BIOS update program 22 and the new BIOS image 23 exist in at least any of the places of maintenance PC 160, blade 10, shared memory 120, and the like.

When the blade 10 is replaced at the control unit 100 of the storage system, the blade 10 replaced does not always have the latest firmware stored. Consequently, at the timing of replacing the blade 10, updating of the firmware held in the replaced blade 10 is automatically decided and executed. Based on the first firmware update method, firmware including previous BIOS 20 is updated with the primary emphasis placed on the control by IOP 11 of the blade 10.

As an example, explanation is made on the case in which blade #2 is replaced with blade #3 because trouble, etc. occur in hardware in blade #2 and blade #2 is unable to be used under the condition in which blades #1 and #2 are mounted and the cluster unit is formed with blade #1 and blade #2 included.

When the blade is replaced, firmware update processing is carried out by each processing method same as the first through the third processing methods when the blade is replaced and in addition, at the time of blade extension in accordance with the difference of the conditions at the time of blade extension. The difference of the condition at the time of blade replacement is automatically decided by the processing by each section of the storage system.

In the cluster configuration including blade #1 and blade #2, the heart-beat communication is carried out between blades #1 and #2 in the cluster. For example, when blade #2 is unable to be used due to occurrence of any trouble, the trouble of the blade #2 is detected by stopping the response of the heat-beat information in the heart-beat communication. When the trouble of the blade #2 is detected, the service to client PC 200 is moved by other blade 10 in the cluster, in the present example, by fail-over to blade #1. For example, service #2 which was operated on blade #2 is moved to OS 21 of the blade #1. The maintenance personnel, etc. replaces the blade #2 with the trouble detected with another blade #3. At this timing, need or no-need of updating is decided for BIOS 20 in the replaced blade #3 and the BIOS is updated to the latest BIOS 20 as required.

FIG. 21 is a flow chart indicating a processing procedure corresponding to the processing method when blade is replaced. First of all, if trouble of blade 10 (for example, blade #2) is detected, on the basis of the mechanism, the information on the blade 10 in the trouble state is displayed on the maintenance PC 160 screen through the second network 42 (S801).

The maintenance personnel and others judge the need or no-need of replacement for the blade (2#) 10 in the trouble state on the basis of the display on the maintenance PC 160 and then, replace the blade (#2) 10 in the trouble state, which is subject to replacement, with a new blade (#3) 10. That is, the maintenance personnel and others removes the blade (#2) 10 in the trouble condition from the slot of the storage system and mount the new blade (#3) 10. By mounting, the replaced blade (#3) 10 is energized (S802).

After that, processing nearly same as that at the time of blade extension is carried out. Processing is carried out by the processing method same as first through the third processing methods in accordance with the conditions at the time of blade exchange (S803-S806). For example, in the case of the first processing method, the BIOS version is checked between BIOS 20 on flash memory of the replaced blade (#3) 10 with the new BIOS image 23 stored in shared memory 120 (S803), and if the version does not coincide and BIOS must be updated (S804-Yes), firmware updating processing is carried out for BIOS 20 of the replaced blade (#3) 10 (S805). The processing of S805 is same as that in S521 through S526. By this, in the replaced blade (#3) 10, the new BIOS is booted and OS 21 is booted.

After BIOS of the replaced blade (#3) 10 is updated and updating is brought to be effective, fail-over is carried out to move the service (service #2) originally operated in the blade (#2) 10 before replacement to the replaced blade (#3) 10, of the services operated on the blade (#1) 10 which took on the services of the blade (#2) 10 in the trouble condition (S806).

As described above, firmware update can be carried out quickly for the replaced blade 10 by each of the processing methods described above in accordance with the conditions at the time of blade 10 replacement due to trouble, etc.

As described above, because in the storage system of each embodiment according to the present invention, service move between blades in the cluster configuration and upgrading of blade firmware are allowed to be operated in linkage to each other, the blade firmware can be updated with the service to clients kept providing. In addition, the firmware can be updated efficiently by each of the processing methods in accordance with the blade conditions.

Now, the invention made by the present inventor has been specifically described on the basis of the embodiments, but needless to say, the present invention shall not be limited to the above-mentioned embodiments, and various changes and modifications may be made in the invention without departing from the spirit and scope thereof.

The present invention can be utilized for a storage system and a computer system and others which are constructed with the storage system included.

What is claimed is:

1. A storage system, comprising:
   a shared memory, storage devices and control units having a plurality of circuit boards that carry out control for storing data in the storage devices, wherein
   each of the circuit boards comprises a CPU; an I/O processor for controlling inputs and outputs between the CPU and the storage devices; a memory which the CPU and the I/O processor use for jobs; a nonvolatile memory which holds firmware; and a network control section that provides services concerning the data inputs and outputs to an information processing apparatus connected via a first network by an OS which operates on the CPU,
   a cluster of fail-over processing is formed with said circuit boards including at least one targeted circuit board for an update of firmware,
   each of the control units has a service moving function for taking over the services between OSs on the circuit boards in the cluster,
   the storage system executes, at the time of updating the firmware for said targeted circuit board for said update of firmware, processings including:
   service move processing to move service being provided by the OS of said targeted circuit board to the OS of another one of the circuit boards in the cluster by the service moving function;
   firmware update processing for updating the firmware on the nonvolatile memory of said targeted circuit board to a new firmware by the use of a firmware update program and a new firmware image for the targeted circuit board which is in a non-service providing state after the move of the service, and
   the I/O processor of said each circuit boards monitors a state of the respective CPU, stores OS state information, that represents operating and installation conditions for the respective OS, on the shared memory, and decides whether to shut down the respective OS and whether to move service between the circuit boards by referring to the OS state information on the shared memory.

2. The storage system according to claim 1, wherein
   in the firmware update processing, for said targeted circuit board which is in the non-service providing state after the move of the service,
   based on the control of the I/O processor, the storage system shuts down the Os, resets and reboots the CPU, and activates the previous firmware on the nonvolatile memory, the activated previous firmware loads the firmware update program to the memory to move the control, and
   the firmware update program loads the new firmware image to the nonvolatile memory, writes the new firmware image to the nonvolatile memory to update the firmware, resets the CPU, and activates the new firmware after the update, and
   by the activated new firmware, the OS is activated, and the I/O processor notifies the firmware update completion.

3. The storage system according to claim 1, wherein for said targeted circuit board for which firmware update is completed by executing the service move processing and firmware update processing, the storage system carries out processing to return back the service moved to said OS of another circuit board in the cluster by the service move function.

4. The storage system according to claim 1, wherein when a number of said targeted circuit boards for the update of firmware is more than one, the storage system successively executes the processing including the service move processing and the firmware update processing on the targeted circuit boards.

5. The storage system according to claim 1, wherein when a number of said targeted circuit boards for the update of firmware is more than one, the storage system concurrently and in parallel executes processing including the service move processing and the firmware update processing on the targeted circuit boards.

6. The storage system according to claim 1, wherein
   the I/O processor of said each circuit boards is connected to a maintenance device through a second network,
   the maintenance device carries out the service move processing based on the communication with said each circuit boards through the second network and update control processing for inputting and outputting the information on the firmware update processing and directions for the jobs related to the firmware update, and
   the maintenance device carries out processing for transmitting the firmware update program and the new firmware image to the I/O processor of said targeted circuit board at the time of the firmware update, according to directions for the I/O processor of said targeted circuit board from the maintenance device, executes the firmware update processing on said targeted circuit board based on the control of the I/O.

7. In the storage system according to claim 1, wherein
   the storage system further comprises another information processing apparatus which is equipped with a managing program same as the information processing apparatus, and
   in the service move processing,
   the information processing apparatus for control performs the processing to transmit the direction for moving the service to OS of said targeted circuit board via the first network, and
   OSs of the circuit boards move the service between OSs of the circuit boards in the cluster based on the directions from the information processing apparatus for managing.

8. In the storage system according to claim 6, wherein
   the maintenance device conducts the processing for transmitting the firmware update program and the new firmware image with the I/O processor of a representative targeted circuit board of a plurality of targeted circuit boards for the update of firmware, the I/O processor of the representative targeted circuit board conducts the processing for storing the firmware update program and the new firmware image to the shared memory, and said plurality of targeted circuit boards for the update of firmware performs the firmware update processing by the use of the firmware update program and the new firmware image stored in the shared memory.

9. The storage system according to claim 6, wherein the storage system further comprises another information processing apparatus which is equipped with a managing program same as the information processing apparatus, and when the firmware is being updated, the information processing apparatus for managing performs the processing for transmitting directions for moving the service to the circuit boards through the first network based on the update control processing in the maintenance device and allows the services to be moved between the OSs on the circuit boards in the cluster based on the directions, and after the service moves, the maintenance device performs the processing to transmit the firmware update directions to the I/O processor of said targeted circuit board to allow the I/O processor to carry out the firmware update processing based on the directions.

10. The storage system according to claim 6, wherein when the firmware is being updated, the maintenance device conducts processing for transmitting firmware update directions to the I/O processor of said targeted circuit board via the second network, the I/O processor of said targeted circuit board gives directions for service move and shut-down to the OS based on the directions from the maintenance device, and the OS of said targeted circuit board carries out the move for taking over the service between OSs on the circuit boards in the cluster, executes shut-down, and performs the firmware update processing after the shut-down based on the directions from the I/O processor of said targeted circuit board.

11. The storage system according to claim 6, wherein when the firmware is being updated, the maintenance device conducts processing for transmitting directions to interrupt the service and update the firmware to a number of said targeted circuit boards, and the targeted circuit boards interrupt the service being provided and do not carry out service move processing based on the directions from the maintenance device, and then perform the firmware update processing, and upon completion of the update, resume the interrupted service.

12. The storage system according to claim 7, wherein in the case where the new firmware image has been stored in the shared memory at the time of expanding the circuit boards to the control units, the storage system carries out processing for deciding whether or not the update is required for the firmware in the circuit boards expanded by referring to the version of the firmware on the respective nonvolatile memory of the circuit boards expanded and the version of the new firmware image stored on the shared memory, and in the event that the update is decided necessary, the storage system acquires the firmware update program and the new firmware image through the respective I/O processor and a second network in the expanded circuit boards and carries out firmware update processing for updating the firmware on the respective nonvolatile memory to the new firmware.

13. The storage system according to claim 7, in the case where the new firmware image has not been stored on the shared memory at the time of expanding the circuit boards to the control units, and other circuit boards are in operation, the storage system directs the respective I/O processor of the circuit boards under operation through a second network from a maintenance device, the respective I/O processor of the circuit boards under operation directs the CPU in accordance with the directions to read the new firmware image from the respective nonvolatile memory, performs the processing for storing the new firmware image read to the shared memory, the storage system carries out processing for deciding whether or not the update is required for the firmware in the circuit boards expanded by referring to the version of the firmware on the respective nonvolatile memory of the circuit boards expanded and the version of the new firmware image stored on the shared memory, and in the event that the update is decided necessary, the storage system acquires the firmware update program and the new firmware image through the respective I/O processor and the second network in the expanded circuit boards and carries out firmware update processing for updating the firmware on the respective nonvolatile memory to the new firmware.

14. The storage system according to claim 7, wherein in the case where the new firmware image has not been stored on the shared memory at the time of expanding the circuit boards to the control units and other circuit boards are not in operation, the storage system transmits the firmware update program and the new firmware image to the respective I/O processor of the circuit boards expanded from a maintenance device through a second network, the expanded circuit boards perform the processing for storing the firmware update program and the new firmware image to the shared memory, the storage system carries out processing for deciding whether or not the update is required for the firmware in the circuit boards expanded by referring to the version of the firmware on the respective nonvolatile memory of the circuit boards expanded and the version of the new firmware image stored on the shared memory, and in the event that the update is decided necessary, the storage system carries out firmware update processing for updating the firmware on the respective nonvolatile memory to the new firmware in the expanded circuit boards.

15. The storage system according to claim 7, wherein when circuit boards of the control units are replaced, the storage system carries out processing for deciding whether or not the update is required for the firmware in the circuit boards replaced by referring to the version of the firmware on the respective nonvolatile memory of the circuit boards replaced and the version of the new firmware image stored on the shared memory or the version of the new firmware image acquired from the maintenance device, and in the event that the update is decided necessary, the storage system acquires the firmware update program and the new firmware image through the respective I/O processor and a second network in the replaced circuit boards and carries out firmware update processing for updating the firmware on the respective nonvolatile memory to the new firmware, and conducts the processing for returning the service from other circuit boards which took over the service being provided by the circuit board before replacement as required after the completion of update.

16. A storage system, comprising:

a shared memory, storage devices and control units having a plurality of circuit boards that carry out control for storing data in the storage devices, wherein each of the circuit boards comprises a CPU; a memory which the CPU uses for jobs; a nonvolatile memory for holding firmware; and network control sections, and provides services concerning the data inputs and outputs to a first information processing apparatus connected via a first network by an OS which operates on the CPU, a cluster of fail-over processing is formed with said circuit boards including at least one targeted circuit board for update of firmware, each of the control units has a service moving function for taking over the services between OSs on the circuit boards in the cluster, a second information processing apparatus is equipped with a managing program same as the first information processing apparatus, the storage system carries out, at the time of updating of firmware for said targeted circuit board, processing for transmitting directions for the updating of firmware to the OS of the targeted circuit board from the second information processing apparatus through the first network, and based on the directions, the storage system executing the processings including:

service move processing for moving service being provided by the OS of the targeted circuit board to the OS of another one of the circuit boards in the cluster by the service moving function, and firmware update processing for updating the firmware on the nonvolatile memory of said targeted circuit board to a new firmware by operating a firmware update program in the OS by the use of the firmware update program and a new firmware image for the target circuit board which is in a non-service providing state after the move of the service, and wherein the I/O processor of said each circuit boards monitors a state of the respective CPU, stores OS state information, that represents operating and installation conditions for the respective OS, on the shared memory, and decides whether to shut down the respective OS and whether to move service between the circuit boards by referring to the OS state information on the shared memory.

17. The storage system according to claim 16, wherein at the time of updating the firmware, the second information processing apparatus performs processing for transmitting directions to move the service from the OS of said targeted circuit board through the first network as the service move processing, based on the directions, the OS of said targeted circuit board moves the service between OSs on the circuit boards in the cluster, after the service is moved, the storage system performs processing for transmitting the firmware update program and the new firmware image to OS of said targeted circuit board from the second information processing apparatus, and the OS of said targeted circuit board executes the firmware update program and conducts the firmware update processing using the new firmware image.

18. The storage system according to claim 16, wherein when the firmware is being updated, the second information processing apparatus performs processing for transmitting directions to update the firmware to the OS of said targeted circuit board through the first network, the OS of said targeted circuit board performs the processing for moving the service between OSs on the circuit boards in the cluster, and then shuts down to perform the firmware updating processing after the shut-down.

19. The storage system according to claim 16, wherein when the firmware is being updated, the second information processing apparatus performs processing for transmitting directions to interrupt the service and update the firmware to OSs of a number of said targeted circuit boards, and the OSs of the targeted circuit boards interrupt the service being provided and do not carry out service move processing based on a directions from the maintenance device, and then perform the firmware update processing, and upon completion of the update, resume the interrupted service.

* * * * *